United States Patent
Uekubo

(10) Patent No.: US 10,855,731 B2
(45) Date of Patent: Dec. 1, 2020

(54) INFORMATION PROCESSING APPARATUS, DATA PROCESSING METHOD THEREOF, AND PROGRAM

(71) Applicant: NEC Corporation, Tokyo (JP)

(72) Inventor: Masaki Uekubo, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/782,389

(22) PCT Filed: Mar. 19, 2014

(86) PCT No.: PCT/JP2014/057536
§ 371 (c)(1),
(2) Date: Oct. 5, 2015

(87) PCT Pub. No.: WO2014/167967
PCT Pub. Date: Oct. 16, 2014

(65) Prior Publication Data
US 2016/0044072 A1 Feb. 11, 2016

(30) Foreign Application Priority Data
Apr. 11, 2013 (JP) ................. 2013-082660

(51) Int. Cl.
*H04L 29/06* (2006.01)
*G11B 27/031* (2006.01)
*H04L 29/08* (2006.01)

(52) U.S. Cl.
CPC .......... *H04L 65/403* (2013.01); *G11B 27/031* (2013.01); *H04L 67/10* (2013.01)

(58) Field of Classification Search
CPC ............... H04L 29/06; H04L 29/08072; H04L 29/06027; H04L 12/581; G11B 27/34;
(Continued)

(56) References Cited

U.S. PATENT DOCUMENTS 6,009,228 A 12/1999 Fujita et al.
6,292,619 B1 9/2001 Fujita et al.
(Continued)

FOREIGN PATENT DOCUMENTS

CN 1798294 A 7/2006
CN 101009619 A 8/2007
(Continued)

OTHER PUBLICATIONS

International Search Report corresponding to PCT/JP2014/057536 dated Jun. 24, 2014 (one page).
(Continued)

*Primary Examiner* — Mahran Y Abu Roumi
(74) *Attorney, Agent, or Firm* — Wilmer Cutler Pickering Hale and Dorr LLP

(57) ABSTRACT

An information processing apparatus (100) includes a conversion unit (102) that converts original data (110) to be edited into processed data (112) having a reduced data volume, a processed data transmission unit (104) that transmits the processed data (112) to a common processing apparatus, a reception unit (106) that receives external edited data (114) indicating editing contents, edited by the common processing apparatus on the processed data (112) from the common processing apparatus, and a composition unit (108) that reflects the editing contents obtained by the common processing apparatus in the original data (110) to be edited on the basis of the external edited data (114) received by the reception unit (106).

16 Claims, 11 Drawing Sheets

(58) Field of Classification Search
CPC ... G11B 27/034; G11B 27/105; G11B 27/031; G11B 27/28
USPC .......................................................... 709/204
See application file for complete search history.

(56) References Cited

U.S. PATENT DOCUMENTS

| | | | |
|---|---|---|---|
| 2005/0025454 A1 | 2/2005 | Nakamura et al. | |
| 2009/0180394 A1* | 7/2009 | Tanaka | H04L 67/141 370/252 |
| 2010/0067674 A1* | 3/2010 | Lee | G06F 3/03545 379/100.01 |
| 2010/0144273 A1* | 6/2010 | Sekikawa | H04N 1/00204 455/41.2 |
| 2010/0262913 A1* | 10/2010 | Takagi | G06F 17/30017 715/723 |
| 2011/0019974 A1 | 1/2011 | Konoshima | |
| 2011/0026898 A1* | 2/2011 | Lussier | G11B 27/034 386/280 |
| 2011/0026899 A1 | 2/2011 | Lussier et al. | |
| 2011/0026900 A1 | 2/2011 | Lussier et al. | |
| 2011/0029883 A1 | 2/2011 | Lussier et al. | |
| 2011/0030031 A1 | 2/2011 | Lussier et al. | |
| 2012/0251080 A1 | 10/2012 | Svendsen et al. | |
| 2012/0251083 A1 | 10/2012 | Svendsen et al. | |
| 2012/0254752 A1 | 10/2012 | Svendsen et al. | |
| 2012/0254778 A1 | 10/2012 | Svendsen et al. | |
| 2012/0284176 A1 | 11/2012 | Svendsen et al. | |
| 2015/0095783 A1 | 4/2015 | Lussier et al. | |
| 2016/0027472 A1 | 1/2016 | Svendsen et al. | |

FOREIGN PATENT DOCUMENTS

| | | |
|---|---|---|
| CN | 101242509 A | 8/2008 |
| CN | 101630964 A | 1/2010 |
| EP | 1503381 A2 | 2/2005 |
| EP | 2150082 A1 | 2/2010 |
| JP | 2002-191011 A | 7/2002 |
| JP | 2005-051491 A | 2/2005 |
| JP | 2010-246008 A | 10/2010 |
| JP | 2011-029980 A | 2/2011 |

OTHER PUBLICATIONS

Extended European Search Report issued by the European Patent Office for European Application No. 14782591.3 dated Feb. 6, 2017 (9 pages).

Chinese Office Action issued by the State Intellectual Property Office of People's Republic of China for Chinese Application No. 201480020603.6 dated Nov. 3, 2017 (20 pages).

Japanese Office Action issued by the Japan Patent Office for Japanese Application No. 2015-511173 dated Dec. 19, 2017 (5 pages).

Chinese Office Action issued by the State Intellectual Property Office of People's Republic of China for Chinese Application No. 201480020603.6 dated Apr. 16, 2018 (27 pages).

* cited by examiner

INFORMATION PROCESSING APPARATUS, DATA PROCESSING METHOD THEREOF, AND PROGRAM

CROSS-REFERENCE TO RELATED APPLICATIONS

This application is a national stage application of International Application No. PCT/JP2014/057536 entitled "Information Processing Apparatus, Data Processing Method Thereof, and Program" filed on Mar. 19, 2014, which claims priority to Japanese Application No. 2013-082660 filed on Apr. 11, 2013, the disclosures of which are hereby incorporated by reference in their entirety.

TECHNICAL FIELD

The present invention relates to an information processing apparatus, a data processing method thereof, and a program.

BACKGROUND ART

An example of a moving image editing apparatus is disclosed in Patent Document 1. The moving image editing apparatus disclosed in Patent Document 1 can store a moving image to be edited, can accept editing of the moving image from a plurality of terminals, and can share the edited image. The moving image editing apparatus disclosed in Patent Document 1 receives an editing request including a reading request and a writing request from a terminal, transmits a data stream to be edited to the terminal from which the reading request is received, stands by until receiving the data stream for editing from the terminal, and executes the received writing request. At this time, when a second moving image having a range, overlapping at least a portion of a reading range of a first moving image which is designated by the reading request, set as a target to be replaced is received, the moving image editing apparatus outputs a moving image having the overlapping range in the reading range of the first moving image replaced with the second moving image to the terminal.

In addition, Patent Document 2 discloses a coordinative editing system that transfers not only the entire edited data between a plurality of video editing systems but also transfers only an editing result portion. Further, Patent Document 2 discloses that, when a result obtained by editing high resolution video data is transferred to a system that edits standard resolution video data, the result is transferred after the edited high resolution data is converted into standard resolution video data.

As described above, these editing apparatuses simultaneously output data such as an image to a plurality of devices, reflect editing contents which are input from the plurality of devices in data in real time, and output the data to the plurality of devices.

RELATED DOCUMENTS

Patent Documents

[Patent Document 1] Japanese Unexamined Patent Publication No. 2011-029980
[Patent Document 2] Japanese Unexamined Patent Publication No. 2002-191011

SUMMARY OF THE INVENTION

Problems to be Solved by the Invention

However, in the above-mentioned editing apparatus, when data is transferred from one device to another device, a large data size results in an increase in a transfer time, and thus there is a problem in that it takes a long time to be able to input editing contents.

The present invention is contrived in view of such situations, and an object thereof is to provide a computer program, an information processing apparatus, and an information processing method which allow data to be efficiently shared or edited between a plurality of devices.

Means for Solving the Problems

According to an aspect of the invention, there is provided a first computer program, the program causing a computer to execute: a procedure of converting original data to be edited into processed data having a reduced data volume; a procedure of transmitting the processed data to a common processing apparatus; a procedure of receiving external edited data indicating editing contents, edited by the common processing apparatus on the processed data from the common processing apparatus; and a procedure of reflecting the editing contents edited by the common processing apparatus in the original data to be edited, on the basis of the received external edited data.

According to another aspect of the invention, there is provided a second computer program, the program causing a computer to execute: a processed data reception procedure of receiving processed data, having a reduced data volume, which is obtained by converting original data to be edited from another information processing apparatus; a procedure of obtaining internal edited data indicating editing contents on the processed data by outputting, in an editable manner, the received processed data; and a procedure of transmitting the obtained internal edited data to the another information processing apparatus.

According to still another aspect of the invention, there is provided a first information processing apparatus including: a conversion unit that converts original data to be edited into processed data having a reduced data volume; a transmission unit that transmits the processed data to a common processing apparatus; a reception unit that receives external edited data indicating editing contents, edited by the common processing apparatus on the processed data from the common processing apparatus; and a composition unit that reflects the editing contents edited by the common processing apparatus in the original data to be edited, on the basis of the external edited data received by the reception unit.

According to still another aspect of the invention, there is provided a second information processing apparatus including: a processed data reception unit that receives processed data, having a reduced data volume, which is obtained by converting original data to be edited from another information processing apparatus; a data obtaining unit that obtains internal edited data indicating editing contents on the processed data by outputting, in an editable manner, the processed data received by the processed data reception unit; and an edited data transmission unit that transmits the internal edited data obtained by the data obtaining unit to the another information processing apparatus.

According to still another aspect of the invention, there is provided a first data processing method of an information processing apparatus, the method including: causing the information processing apparatus to convert original data to be edited into processed data having a reduced data volume, transmit the processed data to a common processing apparatus, receive external edited data indicating editing contents, edited by the common processing apparatus on the processed data from the common processing apparatus, and reflect the editing contents edited by the common processing apparatus in the original data to be edited, on the basis of the received external edited data.

According to still another aspect of the invention, there is provided a first data processing method of an information processing apparatus, the method including: causing the information processing apparatus to receive processed data, having a reduced data volume, which is obtained by converting original data to be edited from another information processing apparatus, obtain internal edited data indicating editing contents on the processed data by outputting, in an editable manner, the received processed data, and transmit the obtained internal edited data to the another information processing apparatus.

Meanwhile, note that those obtained by converting any combination of the foregoing components and the representation of the present invention between a method, a device, a system, a recording medium, a computer program, and the like are also effective as aspects of the present invention.

In addition, various types of components of the present invention are not necessarily required to be present individually and independently, but a plurality of components may be formed as one member, one component may be formed by a plurality of members, a certain component may be a portion of another component, a portion of a certain component and a portion of another component may be the same as each other, or the like.

In addition, a plurality of procedures are described in order in the data processing method and the computer program of the present invention, but the order of the description is not intended to limit the order of the execution of the plurality of procedures. Therefore, when the data processing method and the computer program of the present invention are executed, the order of the plurality of procedures may be changed within the range of not causing any problem in terms of the contents.

Further, the plurality of procedures of the data processing method and the computer program of the present invention are not limited to being individually executed at timings different from each other. Therefore, another procedure may occur during the execution of a certain procedure, the execution timing of a certain procedure and a portion or all of the execution timings of another procedure may overlap each other, or the like.

Effects of the Invention

According to the present invention, provided are a computer program, an information processing apparatus, and an information processing method which allow data to be efficiently shared or edited between a plurality of devices.

BRIEF DESCRIPTION OF THE DRAWINGS

The above-mentioned objects, other objects, features and advantages will be made clearer from the preferred exemplary embodiments described below, and the following accompanying drawings.

DESCRIPTION OF EXEMPLARY EMBODIMENTS

Figure 1:
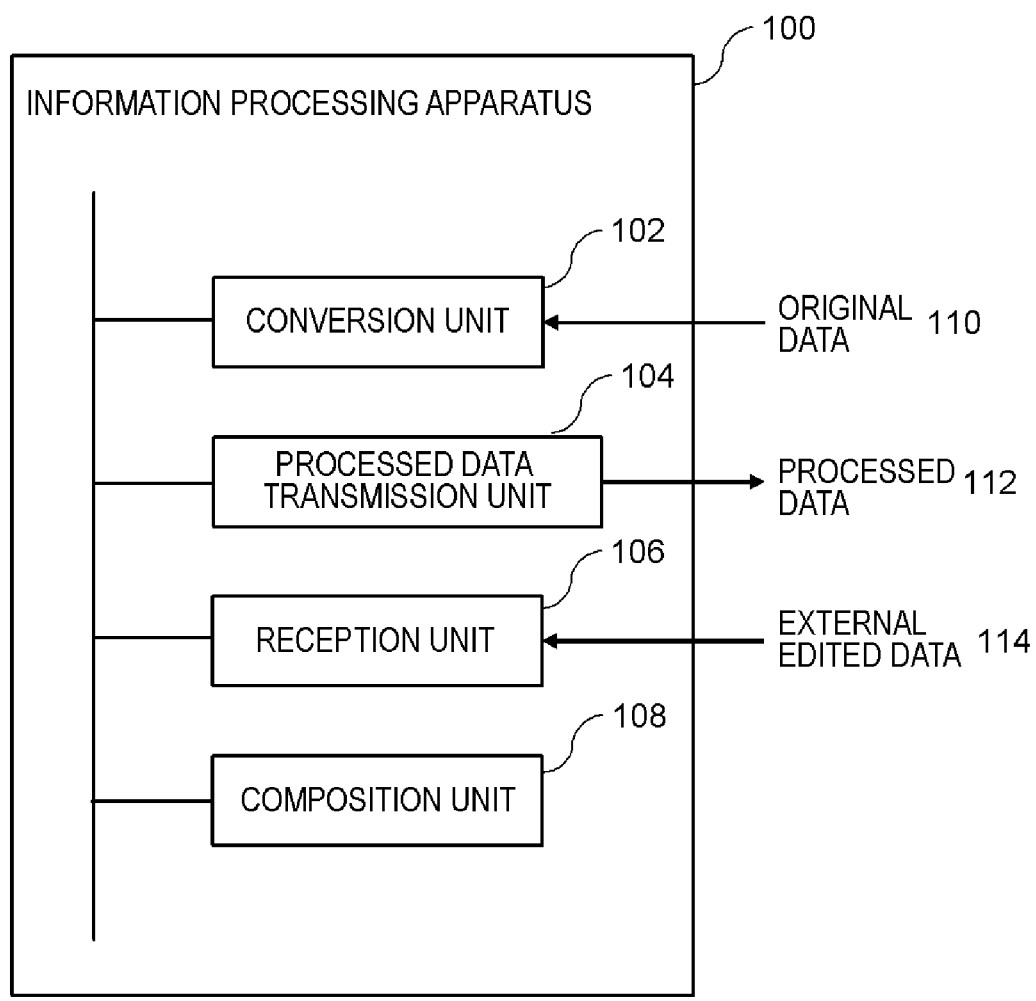
FIG. 1 is a functional block diagram illustrating a configuration of an information processing apparatus according to an exemplary embodiment of the present invention.

Hereinafter, exemplary embodiments of the invention will be described with reference to the accompanying drawings. In all the drawings, like elements are referenced by like reference numerals and descriptions thereof will not be repeated.

First Exemplary Embodiment

FIG. 1 is a functional block diagram illustrating a configuration of an information processing apparatus 100 according to an exemplary embodiment of the present invention.

The information processing apparatus 100 according to the exemplary embodiment of the present invention includes a conversion unit 102 that converts original data 110 to be edited into processed data 112 having a reduced data volume, a processed data transmission unit 104 that transmits the processed data 112 to a common processing apparatus (not shown), a reception unit 106 that receives external edited data 114 indicating editing contents, edited by the common processing apparatus on the processed data 112 from the common processing apparatus, and a composition unit 108 that reflects editing contents edited by the common processing apparatus in the original data 110 to be edited, on the basis of the external edited data 114 received by the reception unit 106.

In the present exemplary embodiment, the information processing apparatus 100 and other similar information processing apparatuses may share and edit the original data 110 with each other, and may share mutual editing contents. Here, an apparatus sharing data with the information processing apparatus 100 will be referred to as a common processing apparatus.

As a scene in which the information processing apparatus 100 of the present invention is used, for example, a situation is considered where when a photograph is taken by the information processing apparatus 100, people in the scene immediately share the photograph through wireless fidelity (Wi-Fi), and all the people add handwritten characters and graffiti, and store and share the results thereof.

As described later, the information processing apparatus 100 and the common processing apparatus include a communication unit for transmitting and receiving data to and from each other in order to share the data. Although the communication unit is not particularly limited, it is possible to consider various communication units such as, for example, a short-distance communication unit such as a wireless local area network (LAN), Bluetooth (registered trademark), or infrared rays or a communication unit connected to a wide-area communication network for a mobile phone or the Internet.

In the present exemplary embodiment, the information processing apparatus 100 or the common processing apparatus are described by taking a smartphone 10 as an example, but the present invention is not limited thereto. Examples of the information processing apparatus 100 or the common processing apparatus include apparatuses having a wireless communication function such as a mobile phone, a personal digital assistant (PDA), a tablet terminal, a personal computer, a game machine, a digital camera, an image display device, and other electronic devices, in addition to a smartphone.

Meanwhile, in each of the following drawings, the configurations of portions irrelevant to the essence of the present invention are omitted and not illustrated.

Figure 2:
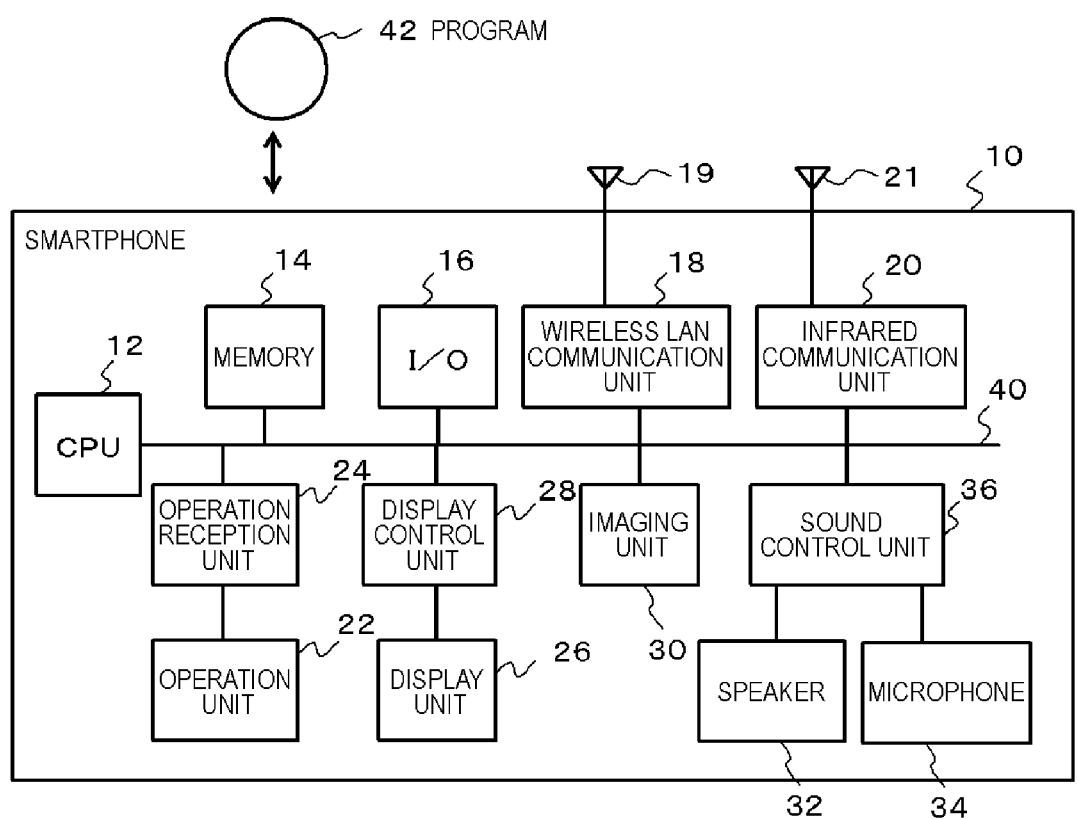
FIG. 2 is a block diagram illustrating a configuration of a smartphone which is an example of the information processing apparatus or a common processing apparatus according to the exemplary embodiment of the present invention.

FIG. 2 is a block diagram illustrating a configuration of the smartphone 10 which is an example of the information processing apparatus 100 or the common processing apparatus according to the exemplary embodiment of the present invention. As illustrated in FIG. 2, the smartphone 10 of the present exemplary embodiment includes a central processing unit (CPU) 12, a memory 14, an I/O 16, a wireless LAN communication unit 18, an infrared communication unit 20, an operation unit 22, an operation reception unit 24, a display unit 26, a display control unit 28, an imaging unit 30, a speaker 32, a microphone 34, and a sound control unit 36.

The CPU 12 is connected to components of the smartphone 10 through a bus 40, and controls the whole smartphone 10 together with the components. The memory 14 stores a program for operating the smartphone 10, various types of setting data which are used when the program thereof is operated, and user data including application data, and the like and has a region for temporarily storing data such as a work area that is used to operate the program. The I/O 16 controls inputs and outputs between the CPU 12 of the smartphone 10 and the components through the bus 40.

In the present exemplary embodiment, the wireless LAN communication unit 18 and the infrared communication unit 20 of the smartphone 10 are included as communication units of the information processing apparatus 100 or the common processing apparatus. The wireless LAN communication unit 18 performs wireless LAN communication with another communication device capable of performing wireless LAN communication (so-called Wi-Fi) based on the IEEE802.11 series, through a first antenna 19. Alternatively, the wireless LAN communication unit may communicate with another communication device through a relay station (not shown). The infrared communication unit 20 performs infrared communication with another communication device through a second antenna 21.

The operation unit 22 includes operation keys, operation buttons, switches, a jog dial, a touch pad, a touch panel, or the like. The operation reception unit 24 receives an operation of the operation unit 22 by a user and notifies the CPU 12 of the operation. The display unit 26 includes a light emitting diode (LED) display, a liquid crystal display, an organic electroluminescence (EL) display, or the like. The display control unit 28 performs various screen displays on the display unit 26 in accordance with an instruction from the CPU 12.

In a case of the smartphone 10, at least a portion of the operation unit 22 and the display unit 26 are integrally configured by a touch panel (not shown).

The sound control unit 36 controls the input and output of sound to and from the speaker 32, the microphone 34, or an external acoustic device in accordance with an instruction from the CPU 12.

The above-mentioned constituent elements of the information processing apparatus 100 are implemented by any combination of hardware and software of any computer (not shown) including the CPU 12, the memory 14, a program 42 for implementing the components of FIG. 1 which is loaded into the memory 14, and interfaces for network connection (the I/O 16, the wireless LAN communication unit 18, and the infrared communication unit 20). It will be understood to those skilled in the art that there are various modified examples in the realization method thereof and the devices. Each drawing described below shows a block of a functional unit rather than the configuration of a hardware unit.

In the information processing apparatus 100 of the present exemplary embodiment, various types of processing operations corresponding to the computer program 42 are executed by the CPU 12, and thus various types of unit as mentioned above are realized as various types of functions.

The computer program 42 of the present exemplary embodiment is described as causing a computer for realizing the information processing apparatus 100 to execute a procedure of converting the original data 110 to be edited into the processed data 112 having a reduced data volume, a procedure of transmitting the processed data 112 to the common processing apparatus, a procedure of receiving the external edited data 114 indicating editing contents, edited by the common processing apparatus on the processed data 112 from the common processing apparatus, and a procedure of reflecting the editing contents edited by the common processing apparatus in the original data 110 to be edited, on the basis of the received external edited data 114.

The computer program 42 of the present exemplary embodiment may be recorded in a computer readable recording medium. The recording medium is considered to have various forms without being particularly limited. In addition, the program may be loaded from the recording medium into a memory of a computer, and may be downloaded to a computer through a network and loaded into a memory.

Referring back to FIG. 1, the components of the information processing apparatus 100 will be described in detail.

The conversion unit 102 inputs the original data 110 to be edited, converts the original data into the processed data 112 having a reduced data volume, and delivers the converted data to the processed data transmission unit 104. The original data 110 may be, for example, an image, a movie, sound, text, or a combination thereof. In the present exemplary embodiment, for example, an image or a movie which is captured by the imaging unit 30 of the smartphone 10 may be input. A method of inputting the original data 110 is not limited thereto. For example, the original data may be downloaded from a server or the like through a network, may be directly received from another apparatus through short-distance communication, may be read from a recording medium, may be input from the microphone 34 of the smartphone 10, or may be input through a combination thereof.

Here, processing for reducing data volume which is performed by the conversion unit 102 may include at least one of image processing such as a change in resolution, cutting out (trimming) of a partial region, a change in the number of colors, a change in a compression ratio, a change in encoding parameters, a change in a frame rate, and a change in a sampling rate.

The processed data transmission unit 104 transmits the processed data 112 received from the conversion unit 102 to the common processing apparatus. Meanwhile, when the number of common processing apparatuses serving as transmission destinations is two or more, the pieces of processed data may be transmitted using a different communication unit or the same communication unit for each apparatus, or may be simultaneously transmitted using the same communication unit for at least some of the plurality of apparatuses, for example may be distributed through multicasting.

The reception unit 106 receives the external edited data 114 indicating editing contents, edited by the common processing apparatus on the processed data 112 from the common processing apparatus 120.

In the present exemplary embodiment, the processed data transmission unit 104 and the reception unit 106 may be constituted by the wireless LAN communication unit 18 or the infrared communication unit 20 of the smartphone 10 of FIG. 2. Meanwhile, when the processed data transmission unit 104 or the reception unit 106 communicates with the common processing apparatus, it is assumed that the information processing apparatus 100 and the common processing apparatus complete an authentication process in advance and establish a state allowing communication.

A timing when the processed data transmission unit 104 transmits the processed data 112 is not particularly limited. For example, the processed data transmission unit may transmit the data immediately after obtaining the original data 110, or may transmit the data at any timing designated by a user of the information processing apparatus 100. Alternatively, the processed data transmission unit may transmit the data at the time of receiving a request for transmission from the common processing apparatus after receiving the original data 110.

In the present exemplary embodiment, the editing performed by the common processing apparatus may include editing operations such as, for example, the addition of a handwritten character or a drawing to an image, the incorporation of a marker, a stamp, a frame, text, an illustration, or the like into an image, the execution of photo retouching, such as the adjustment of brightness and a color tone, noise reduction, red-eye correction, the addition of a skin-beautifying effect, a twinkling effect, or the like, converting into illustration, feathering, deforming, size enlargement, or size reduction, which is performed on an image, the addition of sound (for example, a sound, a sound effect, background music, or the like) to an image or sound, and the like.

The external edited data 114 may include information indicating editing contents, edited by the common processing apparatus on the processed data 112, and may include information such as, for example, parameters indicating an editing processing type, an editing position, and editing contents. In the present exemplary embodiment, the editing contents of the common processing apparatus may be rapidly shared by adopting a configuration in which only the external edited data 114 is received.

A timing when the external edited data 114 is received from the common processing apparatus is not particularly limited. For example, a request may be made from the information processing apparatus 100 to the common processing apparatus at a periodical or arbitrary timing, or the information processing apparatus 100 may receive data, transmitted from the common processing apparatus at a periodical or arbitrary timing, at a timing determined in the common processing apparatus whenever the occasion demands.

For example, the information processing apparatus 100 is provided with an updating button for updating a display screen of the original data 110 to a latest state, or the like, and a request for the external edited data 114 may be made to the common processing apparatus at a timing when a user's operation is received. Alternatively, the common processing apparatus may transmit the data to the information processing apparatus 100 whenever received editing processing is confirmed, may transmit the data to the information processing apparatus 100, or may sequentially transmit editing states in the common processing apparatus to the information processing apparatus 100.

The composition unit 108 reflects editing contents edited by the common processing apparatus in the original data 110 to be edited, on the basis of the received external edited data 114. For example, the composed data composed by the composition unit 108 may have an image displayed on the display unit 26 of the smartphone 10, or sound output from the speaker 32. In the information processing apparatus 100, the composed data may be stored in the memory 14 (FIG. 2) of the main body of the information processing apparatus 100, may be recorded in a recording medium in which writing can be performed by the information processing apparatus 100, or may be transmitted to another apparatus.

Figure 3:
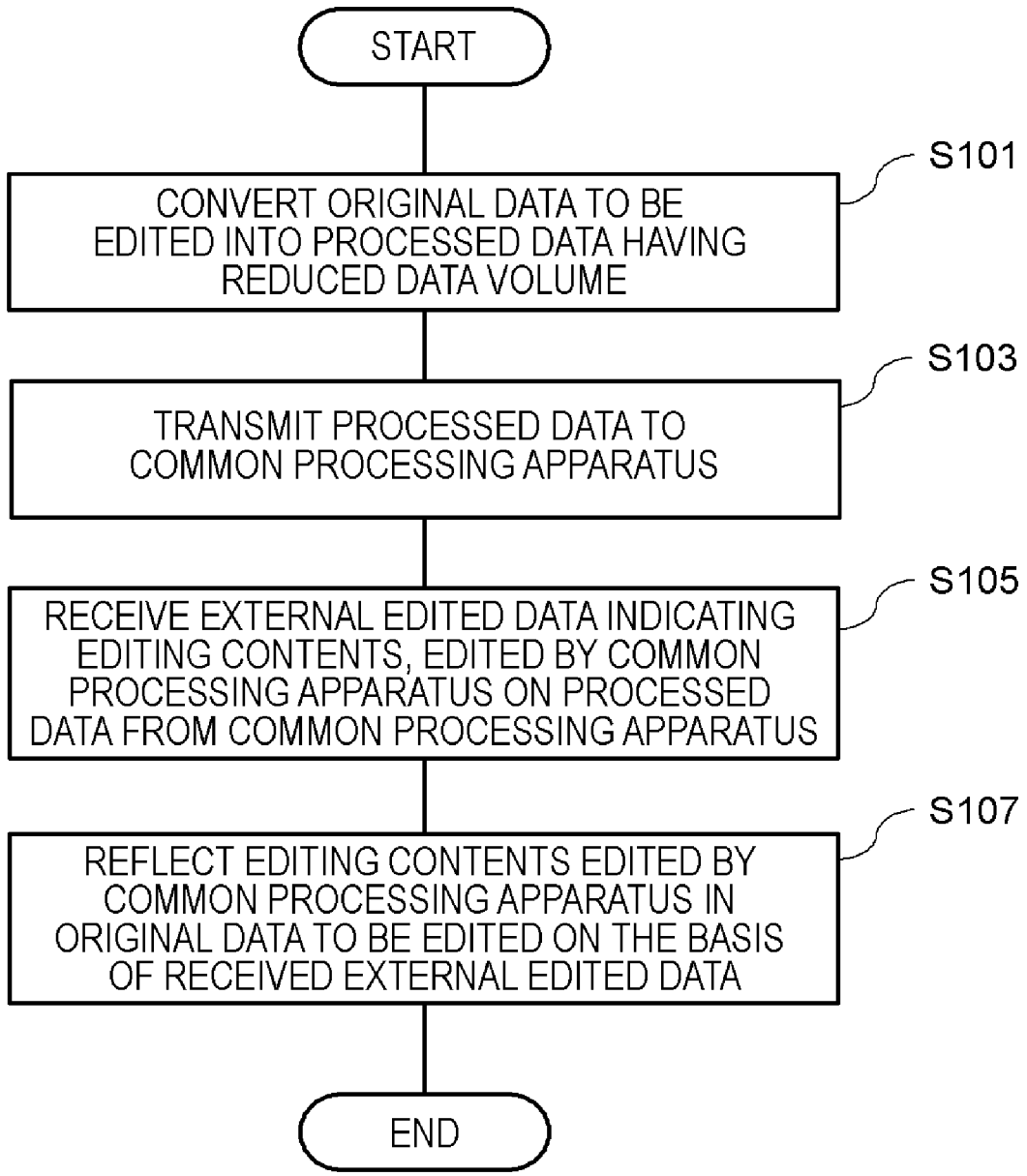
FIG. 3 is a flow chart illustrating an example of an operation of the information processing apparatus according to the exemplary embodiment of the present invention.

In the above-mentioned configuration, a data processing method of the information processing apparatus 100 according to the exemplary embodiment of the present invention will be described below. FIG. 3 is a flow chart illustrating an example of an operation of the information processing apparatus 100 according to the exemplary embodiment of the present invention.

In the data processing method of the information processing apparatus 100 according to the exemplary embodiment of the present invention, the information processing apparatus 100 converts the original data 110 to be edited into the processed data 112 having a reduced data volume (step S101), transmits the processed data 112 to a common processing apparatus (step S103), receives the external edited data 114 indicating editing contents, edited by the common processing apparatus on the processed data 112 from the common processing apparatus (step S105), and reflects the editing contents edited by the common processing apparatus in the original data 110 to be edited on the basis of the received external edited data 114 (step S107).

Meanwhile, in this flow chart, it is assumed that step S105 and step S107 are repeatedly performed while the information processing apparatus 100 shares data with the common processing apparatus 120.

An operation of the information processing apparatus 100 of the present exemplary embodiment will be described below in more detail.

Figure 4:
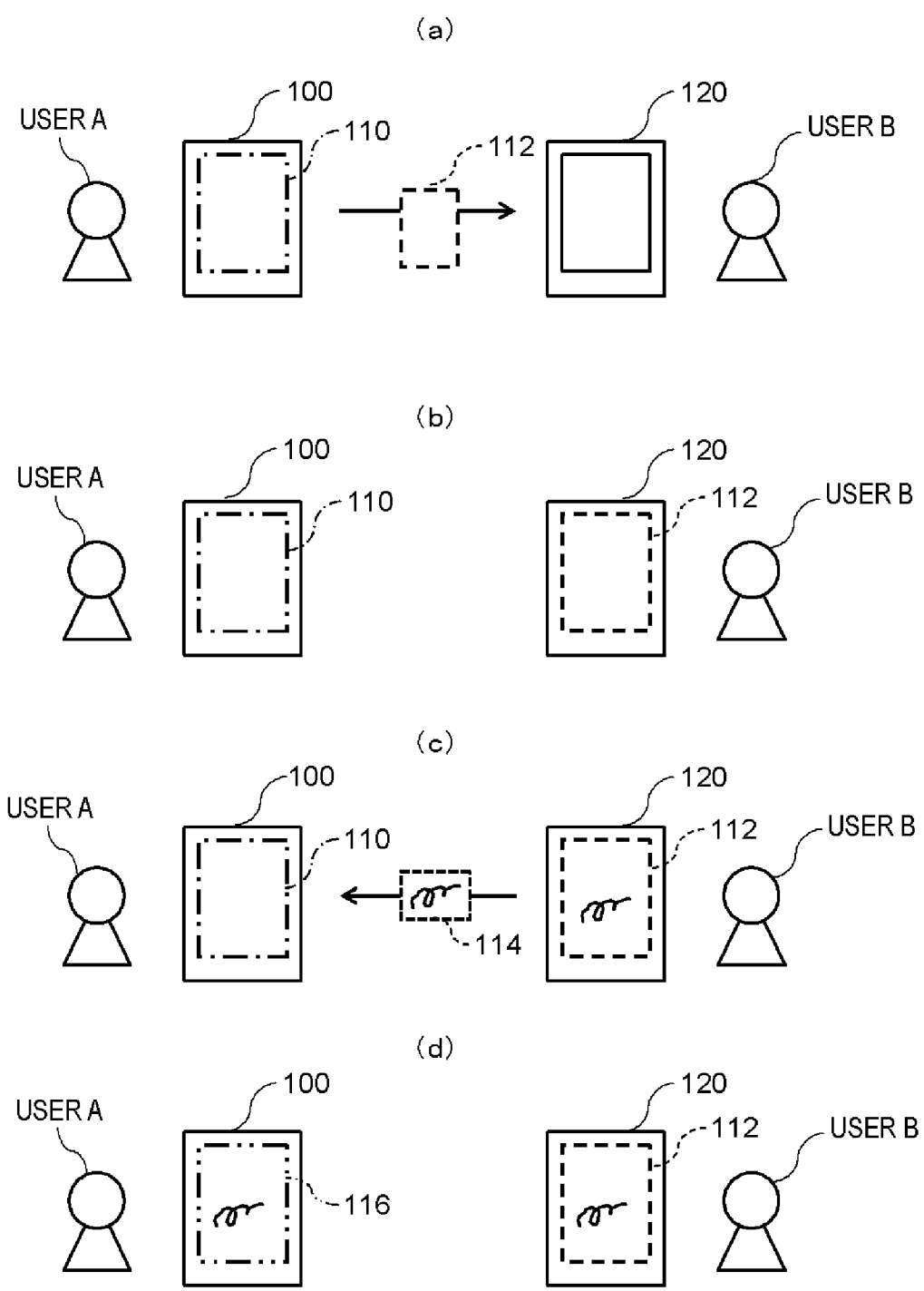
FIG. 4 are diagrams illustrating operations of the information processing apparatus and the common processing apparatus according to the exemplary embodiment of the present invention.

FIG. 4 are diagrams illustrating operations of the information processing apparatus 100 and the common processing apparatus according to the exemplary embodiment of the present invention.

Here, an operation in a case where a user A and a user B share a photograph using the information processing apparatus 100 and the common processing apparatus 120 respectively and where editing contents of the user B is shared with the user A will be described as an example.

First, as illustrated in FIG. 4(a), in the information processing apparatus 100, the processed data transmission unit 104 transmits the processed data 112, obtained by the conversion unit 102 reducing the data volume of the original data 110, to the common processing apparatus 120. Here, the common processing apparatus 120 may be configured as the similar apparatus to the information processing apparatus 100. In the present exemplary embodiment, the common processing apparatus is assumed to be the smartphone 10 of FIG. 2 as described above. At this time, for example, the original data 110 is displayed on the display unit 26 (FIG. 2) of the information processing apparatus 100.

In this manner, in the information processing apparatus 100 of the present exemplary embodiment, the processed data 112 having a data volume smaller than that of the original data 110 is transmitted, and thus it is possible to have a lower transmission volume compared to a case where the original data 110 is transmitted. Therefore, it is possible to reduce a time required for transmission and to reduce a communication cost. That is, it is possible to rapidly start the sharing of data with the common processing apparatus and the editing of the data.

In the common processing apparatus 120, as illustrated in FIG. 4(b), the processed data 112 is received, and is displayed in an editable manner on the display unit 26 (FIG. 2). In the common processing apparatus 120, as illustrated in FIG. 4(c), when the user B edits the processed data 112 and adds, for example, handwritten drawing, the external edited data 114 indicating the editing contents thereof is transmitted from the common processing apparatus 120 to the information processing apparatus 100.

In the information processing apparatus 100, the reception unit 106 receives the external edited data 114 indicating editing contents, edited by the common processing apparatus 120 on the processed data 112 from the common processing apparatus 120.

In the information processing apparatus 100, the composition unit 108 reflects the editing contents edited by the common processing apparatus 120 in the original data 110 to be edited, on the basis of the received external edited data 114. As illustrated in FIG. 4(d), the composed data 116 is displayed on the display unit 26 of the information processing apparatus 100. In this manner, the editing contents obtained by the common processing apparatus 120 are reflected in the information processing apparatus 100, and the editing contents may be shared.

Meanwhile, FIG. 4 illustrate only one common processing apparatus 120 that shares data with the information processing apparatus 100. However, the present invention is not limited thereto, and the data may be shared with a plurality of common processing apparatuses 120.

In this manner, in the information processing apparatus 100 of the present exemplary embodiment, only external edited data 114 indicating the editing contents edited by another common processing apparatus, is received and reflected in the original data 110, and thus it is possible to have a lower volume of received data compared to a case where all of the edited data is received, to reduce a time required for reception, and to reduce a communication cost.

As described above, according to the information processing apparatus 100 of the exemplary embodiment of the present invention, it is possible to efficiently share and edit data between a plurality of devices.

Second Exemplary Embodiment

Figure 5:
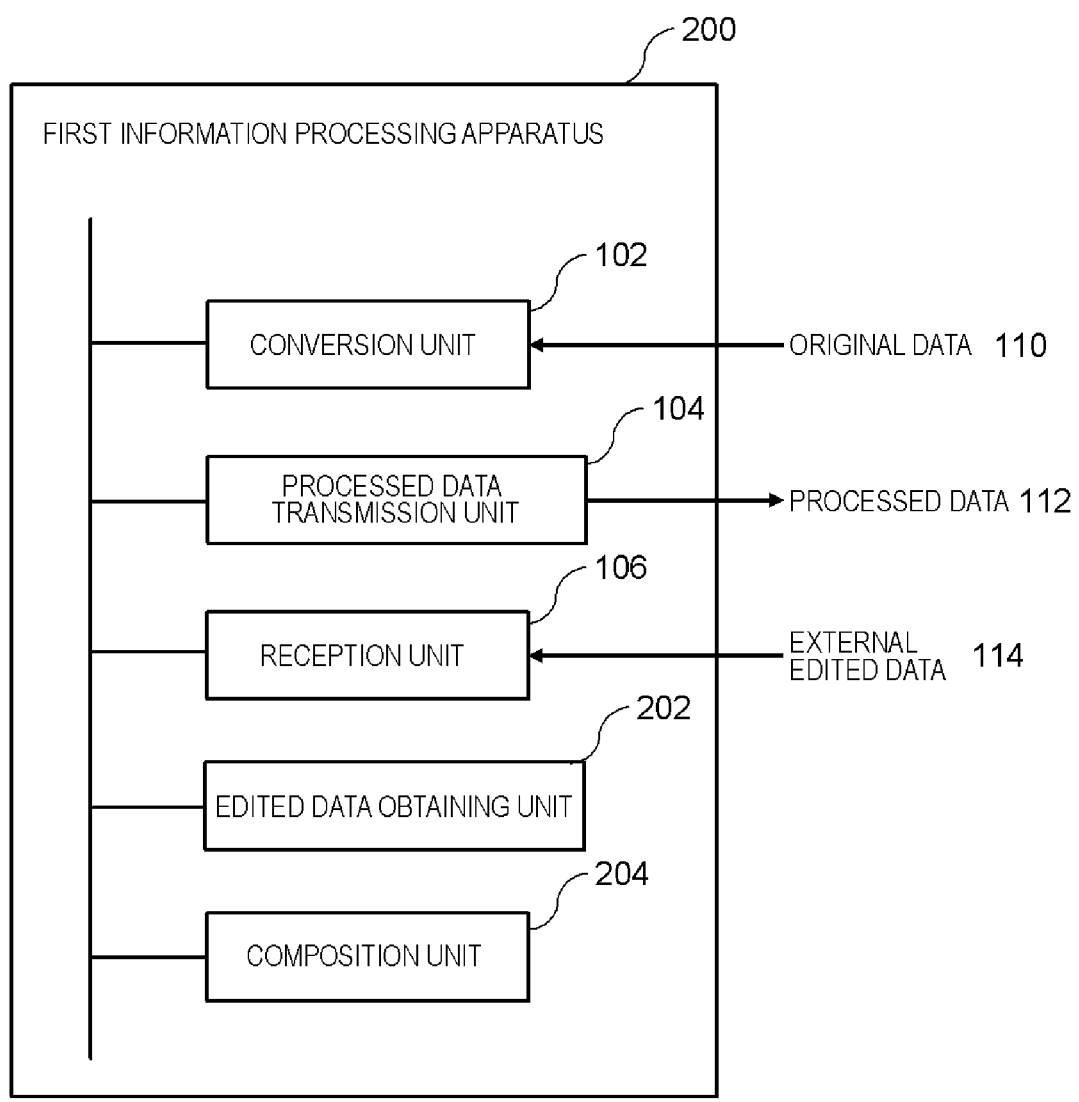
FIG. 5 is a functional block diagram illustrating a configuration of a first information processing apparatus according to an exemplary embodiment of the present invention.
Figure 6:
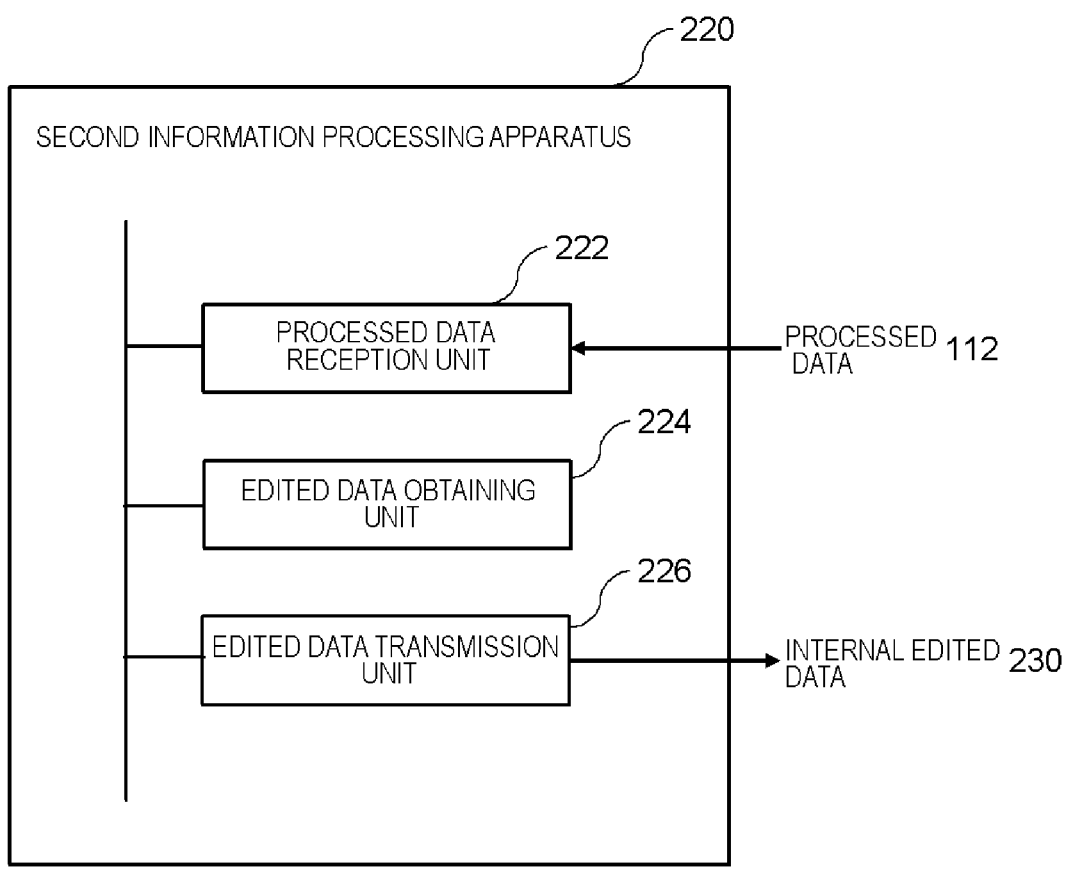
FIG. 6 is a functional block diagram illustrating a configuration of a second information processing apparatus according to the exemplary embodiment of the present invention.

FIG. 5 is a functional block diagram illustrating a configuration of a first information processing apparatus 200 according to an exemplary embodiment of the present invention. In addition, FIG. 6 is a functional block diagram illustrating a configuration of a second information processing apparatus 220 according to an exemplary embodiment of the present invention.

In the present exemplary embodiment, between the first information processing apparatus 200 and the second information processing apparatus 220 may share data and reflect edited information in both the apparatuses. The second information processing apparatus 220 is equivalent to the common processing apparatus 120 of the above-described exemplary embodiment.

The exemplary embodiment of the present invention is different from the above-described exemplary embodiment in that, in addition, the first information processing apparatus 200 may edit original data or processed data which is shared with the second information processing apparatus 220, compose data is generated by reflecting the editing contents thereof together with external edited data transmitted from the second information processing apparatus 220, and the first information processing apparatus 200 may share the editing contents for data with the second information processing apparatus 220.

In addition, in the present exemplary embodiment, it is assumed that the first information processing apparatus 200 and the second information processing apparatus 220 complete an authentication process and the like in advance and establish a state allowing communication. Similarly to the above-described exemplary embodiment, a unit for communication between the first information processing apparatus 200 and the second information processing apparatus 220 is not particularly limited.

The first information processing apparatus 200 of the present exemplary embodiment further includes an edited data obtaining unit 202 in addition to a conversion unit 102, a processed data transmission unit 104, and a reception unit 106 which are the similar to those of the information processing apparatus 100 according to the above-described exemplary embodiment of FIG. 1. The first information processing apparatus 200 further includes a composition unit 204 instead of the composition unit 108 of the information processing apparatus 100 according to the above-described exemplary embodiment of FIG. 1.

The first information processing apparatus 200 according to the exemplary embodiment of the present invention further includes the edited data obtaining unit 202 that obtains internal edited data indicating editing contents for original data 110 to be edited or processed data 112 by outputting, in an editable manner, the original data 110 to be edited or the processed data 112.

Further, the composition unit 204 reflects the editing contents in the original data 110 to be edited, on the basis of the internal edited data.

The second information processing apparatus 220 according to the exemplary embodiment of the present invention further includes a processed data reception unit 222 that receives the processed data 112, having a reduced data volume, which is obtained by converting the original data 110 to be edited, from another information processing apparatus (first information processing apparatus 200), an edited data obtaining unit 224 that obtains internal edited data 230 indicating editing contents on the processed data 112 by outputting, in an editable manner, the processed data 112 received by the processed data reception unit 222, and an edited data transmission unit 226 that transmits the internal edited data 230 obtained by the edited data obtaining unit 224 to the second information processing apparatus 220.

The first information processing apparatus 200 and the second information processing apparatus 220 of the present exemplary embodiment are described by taking a smartphone 10 as an example, similar to the information processing apparatus 100 of the above-described exemplary embodiment.

In the first information processing apparatus 200, the edited data obtaining unit 202 displays the original data 110 or the processed data 112 on, for example, a display unit 26 (FIG. 2), and receives an editing operation operated using an operation unit 22 (FIG. 2) by a user of the first information processing apparatus 200 to thereby obtains the data as internal edited data.

As described in the above-described exemplary embodiment, the editing operation may include editing operations such as, for example, the addition of a handwritten character or a drawing to an image, the incorporation of a marker, a stamp, a frame, text, an illustration, or the like into an image, the execution of photo retouching, such as the adjustment of brightness and a color tone, noise reduction, red-eye correction, the addition of a skin-beautifying effect, a twinkling effect, or the like, converting into illustration, feathering, deforming, size enlargement, or size reduction, which is performed on an image, the addition of sound (for example, a sound, a sound effect, or background music) to an image or sound, and the like.

The editing operations may be received in an operation reception unit 24 through a graphical user interface (GUI) such as a menu, an operation button, an icon, a list, or an input reception column which is included in an editing screen displayed on the display unit 26.

The internal edited data includes information indicating editing contents edited on the processed data 112 in the first information processing apparatus 200, and may include information such as, for example, parameters indicating an editing processing type, an editing position, and editing contents.

The composition unit 204 reflects editing contents edited by the second information processing apparatus 220 in the original data 110 to be edited, on the basis of external edited data 114 received by the reception unit 106, and further reflects the editing contents thereof in the original data 110 to be edited, on the basis of the internal edited data obtained by the edited data obtaining unit 202.

In the present exemplary embodiment, the composition unit 204 may reflect the external edited data 114 received by the reception unit 106 and the internal edited data obtained by the edited data obtaining unit 202 in accordance with predetermined priority order.

The priority order may be determined in advance together with a condition such as apparatus attribute information regarding the information processing apparatus 100 or the common processing apparatus such as a type, a specification, and performance, a type of edited data and the contents thereof, the data volume of edited data, a type of original data 110, the data volume of the original data 110, the number of apparatuses participating in sharing, a communication unit, communication state, or a combination thereof.

For example, the composed data composed by the composition unit 204 may have an image displayed on the display unit 26 of the smartphone 10, or sound output from a speaker 32. In the first information processing apparatus 200, the composed data may be stored in a memory of a main body of the first information processing apparatus 200, may be recorded in a recording medium in which writing can be performed by the first information processing apparatus 200, or may be transmitted to another apparatus.

In the second information processing apparatus 220, the processed data reception unit 222 receives the processed data 112 from another information processing apparatus, for example, the first information processing apparatus 200. A timing when the processed data reception unit 222 receives the processed data 112 is not particularly limited. For example, a request may be made from the second information processing apparatus 220 to the first information processing apparatus 200 at an arbitrary timing, or the processed data 112 which is transmitted at a timing determined by the first information processing apparatus 200 may be received whenever the occasion demands.

The edited data obtaining unit 224 displays the processed data 112 received by the processed data reception unit 222, for example, on the display unit 26 (FIG. 2), receives an editing operation operated using the operation unit 22 (FIG. 2) by a user of the second information processing apparatus 220, and obtains the data as internal edited data 230. The editing operation and the internal edited data in the edited data obtaining unit 224 are the similar to those described in the edited data obtaining unit 202, and thus a description thereof will not be repeated.

The edited data transmission unit 226 transmits the internal edited data 230 obtained by the edited data obtaining unit 224 to another information processing apparatus, for example, the first information processing apparatus 200 in which the processed data reception unit 222 has received the processed data 112.

Here, the internal edited data 230 to be transmitted is equivalent to the external edited data 114 received by the information processing apparatus 100 of the above-described exemplary embodiment, that is, the first information processing apparatus 200.

In the present exemplary embodiment, the processed data reception unit 222 and the edited data transmission unit 226 may be constituted by the wireless LAN communication unit 18 or the infrared communication unit 20 of the smartphone 10 of FIG. 2. For example, wireless communication between the first information processing apparatus 200 and the second information processing apparatus 220 may be performed by so-called Wi-Fi using the wireless LAN communication unit 18 such that data is transmitted and received therebetween.

In addition, in communication using the infrared communication unit 20, infrared communication between the first information processing apparatus 200 and the second information processing apparatus 220 at a near distance may be performed such that data is transmitted and received therebetween.

Meanwhile, when the processed data reception unit 222 or the edited data transmission unit 226 communicates with the first information processing apparatus 200, it is assumed that the first information processing apparatus 200 and the second information processing apparatus 220 complete an authentication process in advance and establish a state allowing communication.

A timing when the edited data transmission unit 226 transmits the internal edited data 230 is not particularly limited. For example, the data may be transmitted in response to a request from the first information processing apparatus 200 with respect to the second information processing apparatus 220 at a periodical or arbitrary timing, or the second information processing apparatus 220 may transmit the data to the first information processing apparatus 200 at a periodical or arbitrary timing.

For example, the second information processing apparatus 220 may be provided with an updating button for updating a display screen of the processed data 112 to a latest state, or the like, and may transmit the internal edited data 230 to the first information processing apparatus 200 at a timing when a user's operation is received. Alternatively, the second information processing apparatus 220 may transmit the data to the first information processing apparatus 200 whenever received editing processing is confirmed, may transmit the data to the first information processing apparatus 200, or may sequentially transmit editing states in the second information processing apparatus 220 to the first information processing apparatus 200.

Meanwhile, the first information processing apparatus 200 of FIG. 5 may further include the edited data transmission unit 226 which is the similar to that of the second information processing apparatus 220 of FIG. 6. That is, the edited data transmission unit 226 may transmit the original data 110 obtained by the edited data obtaining unit 202 or internal edited data indicating editing contents on the processed data 112 from the first information processing apparatus 200 to the second information processing apparatus 220.

The second information processing apparatus 220 of FIG. 6 may further include the reception unit 106 which is the similar to that of the first information processing apparatus 200 of FIG. 5. That is, the internal edited data in the first information processing apparatus 200 which is external edited data for the second information processing apparatus 220 may be received by the reception unit 106 and may be delivered to the edited data obtaining unit 224, and the external edited data may be reflected in the processed data 112 by the edited data obtaining unit 224 and may be displayed in an editable manner on the display unit 26 (FIG. 2).

In the first information processing apparatus 200 of the present exemplary embodiment, a CPU 12 (FIG. 2) executes various types of processing operations corresponding to a computer program 42 (FIG. 2), and thus the above-mentioned various types of units are realized as various types of functions.

The computer program 42 of the present exemplary embodiment is described as causing a computer for realizing the first information processing apparatus 200 to further execute a procedure of obtaining internal edited data indicating editing contents on the original data 110 to be edited or the processed data 112 by outputting, in an editable manner, the original data 110 to be edited or the processed data 112 and a procedure of further reflecting the editing contents in the original data 110 to be edited, on the basis of the internal edited data, in addition to the procedures of the computer program of the above-described exemplary embodiment.

Further, the computer program 42 of the present exemplary embodiment is described as causing a computer for realizing the first information processing apparatus 200 to execute a procedure of reflecting the external edited data 114 received and the obtained internal edited data in accordance with predetermined priority order, in addition to the above-mentioned procedures of the computer program.

In the second information processing apparatus 220 of the present exemplary embodiment, the CPU 12 (FIG. 2) executes various types of processing operations corresponding to the computer program 42 (FIG. 2), and thus the above-mentioned various types of units are realized as various types of functions.

The computer program 42 of the present exemplary embodiment is described as causing a computer for realizing the second information processing apparatus 220 to execute a procedure of receiving the processed data 112 transmitted from another information processing apparatus (first information processing apparatus 200), a procedure of obtaining the internal edited data 230 indicating editing contents on the processed data 112 by outputting, in an editable manner, the received processed data 112, and a procedure of transmitting the internal edited data 230 obtained to the first information processing apparatus 200.

Operations of the first information processing apparatus 200 and the second information processing apparatus 220 of the present exemplary embodiment which are thus configured in this manner will be described below.

Figure 7:
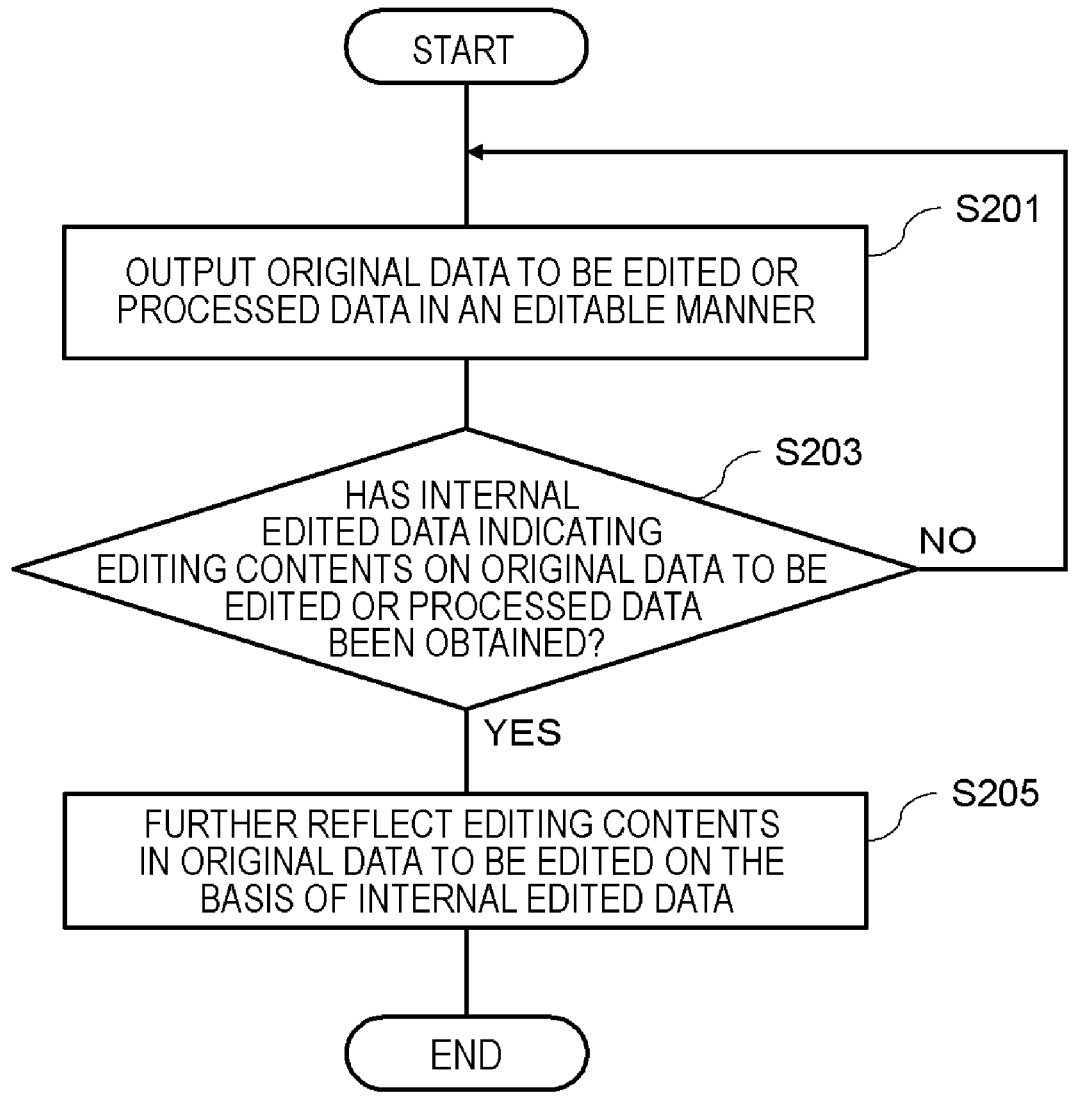
FIG. 7 is a flow chart illustrating an example of an operation of the first information processing apparatus according to the exemplary embodiment of the present invention.
Figure 8:
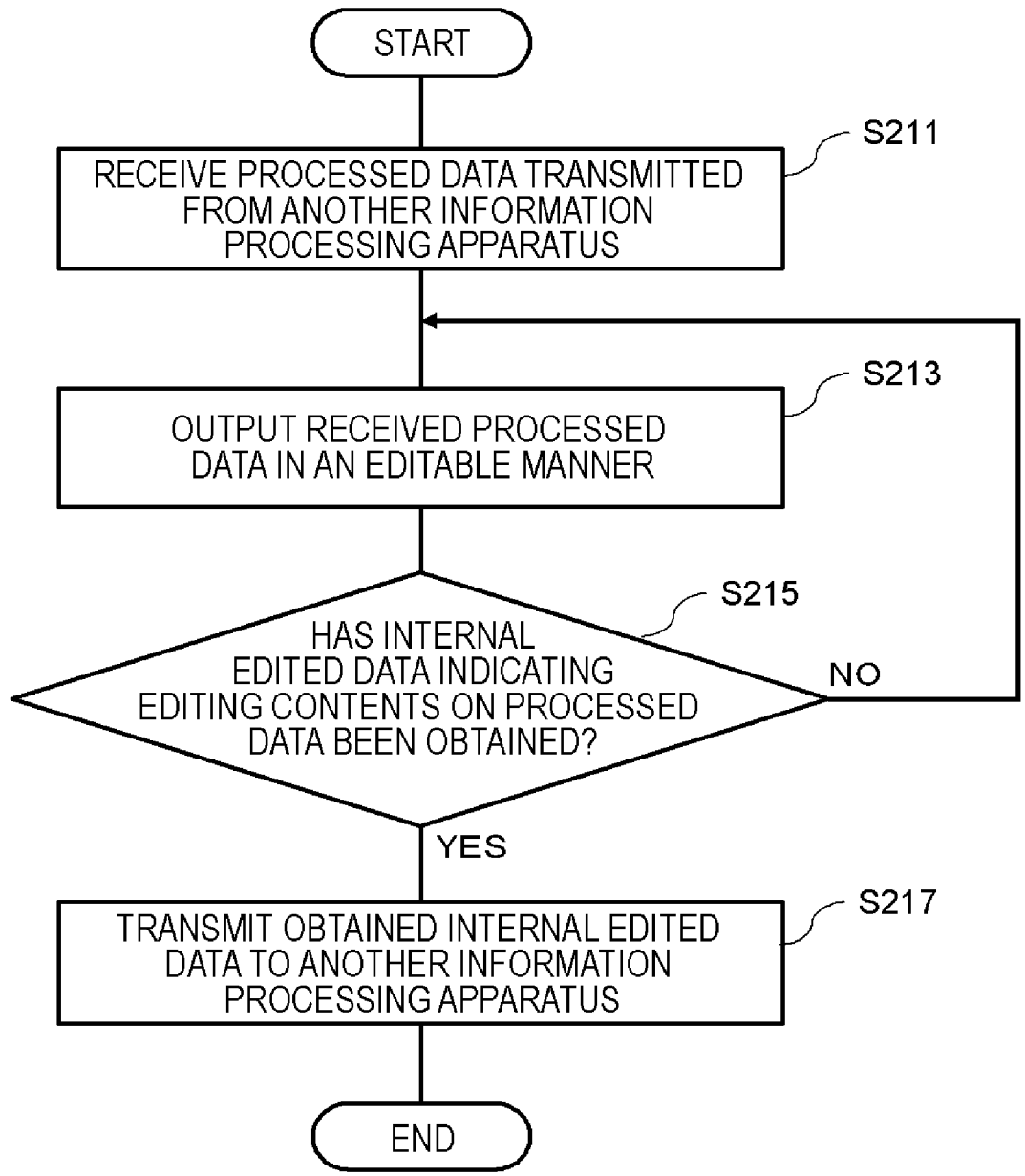
FIG. 8 is a flow chart illustrating an example of an operation of the second information processing apparatus according to the exemplary embodiment of the present invention.

FIG. 7 is a flow chart illustrating an example of an operation of the first information processing apparatus 200 according to the exemplary embodiment of the present invention. FIG. 8 is a flow chart illustrating an example of an operation of the second information processing apparatus 220 according to the exemplary embodiment of the present invention.

First, as illustrated in FIG. 7, in the first information processing apparatus 200, the edited data obtaining unit 202 outputs and displays, in an editable manner, the original data 110 or the processed data 112 on the display unit 26 (FIG. 2) in a state of any step of the flow of FIG. 3 in the above-described exemplary embodiment (step S201). In addition, when the original data 110 or the processed data 112 is video data or sound data, sound is output from the speaker 32 (FIG. 2). The flow of FIG. 3 in the above-described exemplary embodiment and the flow of FIG. 6 in the present exemplary embodiment may be executed in parallel with each other.

At this time, the edited data obtaining unit 202 displays either the original data 110 to be edited which is obtained by the conversion unit 102 or the processed data 112 obtained by the conversion unit 102 converting the original data 110 on the display unit 26. Alternatively, switching between displays of the original data 110 and the processed data 112 may be performed.

When the edited data obtaining unit 202 receives an editing operation operated using the operation unit 22 (FIG. 2) by a user of the first information processing apparatus 200 to thereby obtain internal edited data (YES in step S203), the composition unit 204 reflects the editing contents thereof in the original data 110 to be edited, on the basis of the internal edited data obtained by the edited data obtaining unit 202 in step S203 (step S205). At this time, composed data which is generated is displayed on the display unit 26.

Meanwhile, it is assumed that this flow chart is repeatedly performed during the editing of the original data 110 or the processed data 112 in the first information processing apparatus 200.

Further, when the first information processing apparatus 200 includes the edited data transmission unit 226 and the second information processing apparatus 220 includes the reception unit 106, the edited data transmission unit 226 may transmit the internal edited data obtained by the edited data obtaining unit 202 to the second information processing apparatus 220. In the second information processing apparatus 220, the reception unit 106 may receive internal edited data from the first information processing apparatus 200, in other words, external edited data for the second information processing apparatus 220, the received external edited data may be delivered to the edited data obtaining unit 224, the external edited data may be reflected in the processed data 112 by the edited data obtaining unit 224, and the reflected external edited data may be displayed in an editable manner on the display unit 26 (FIG. 2).

As illustrated in FIG. 8, in a data processing method of the second information processing apparatus 220 according to the exemplary embodiment of the present invention, the second information processing apparatus 220 receives the processed data 112, having a reduced data volume, which is obtained by converting the original data 110 to be edited from another information processing apparatus (first information processing apparatus 200) (step S211), obtains internal edited data indicating editing contents on the processed data by outputting, in an editable manner, the received processed data 112 (step S213, step S215), and transmits the obtained internal edited data to the first information processing apparatus 200 (step S217).

In detail, first, in the second information processing apparatus 220, the processed data reception unit 222 receives the processed data 112 which is transmitted from another information processing apparatus (first information processing apparatus 200) (step S211). The edited data obtaining unit 224 outputs in an editable manner and displays the processed data 112 received by the processed data reception unit 222 on the display unit 26 (FIG. 2) (step S213). In addition, when the processed data 112 is video data or sound data, sound is output from the speaker 32 (FIG. 2).

When the edited data obtaining unit 224 receives an editing operation using the operation unit 22 (FIG. 2) operated by a user of the second information processing apparatus 220 to thereby obtain the data as internal edited data (YES in step S215), the edited data transmission unit 226 transmits the internal edited data 230 obtained by the edited data obtaining unit 202 in step S215 to the first information processing apparatus 200 (step S217).

Meanwhile, at this time, the internal edited data 230 obtained by the edited data obtaining unit 224 is sequentially reflected in the display unit 26.

In addition, in this flow chart, it is assumed that step S213 to step S217 are repeatedly performed during the editing of the processed data 112 in the second information processing apparatus 220. Meanwhile, as described above, various cases for a timing of the transmission in step S217 are considered.

As described above, according to the first information processing apparatus 200 or the second information processing apparatus 220 of the exemplary embodiment of the present invention, it is possible to exhibit the similar effects to those in the above-described exemplary embodiment and to further allow editing results in the first information processing apparatus 200 to be shared with the second information processing apparatus 220.

Third Exemplary Embodiment

Figure 9:
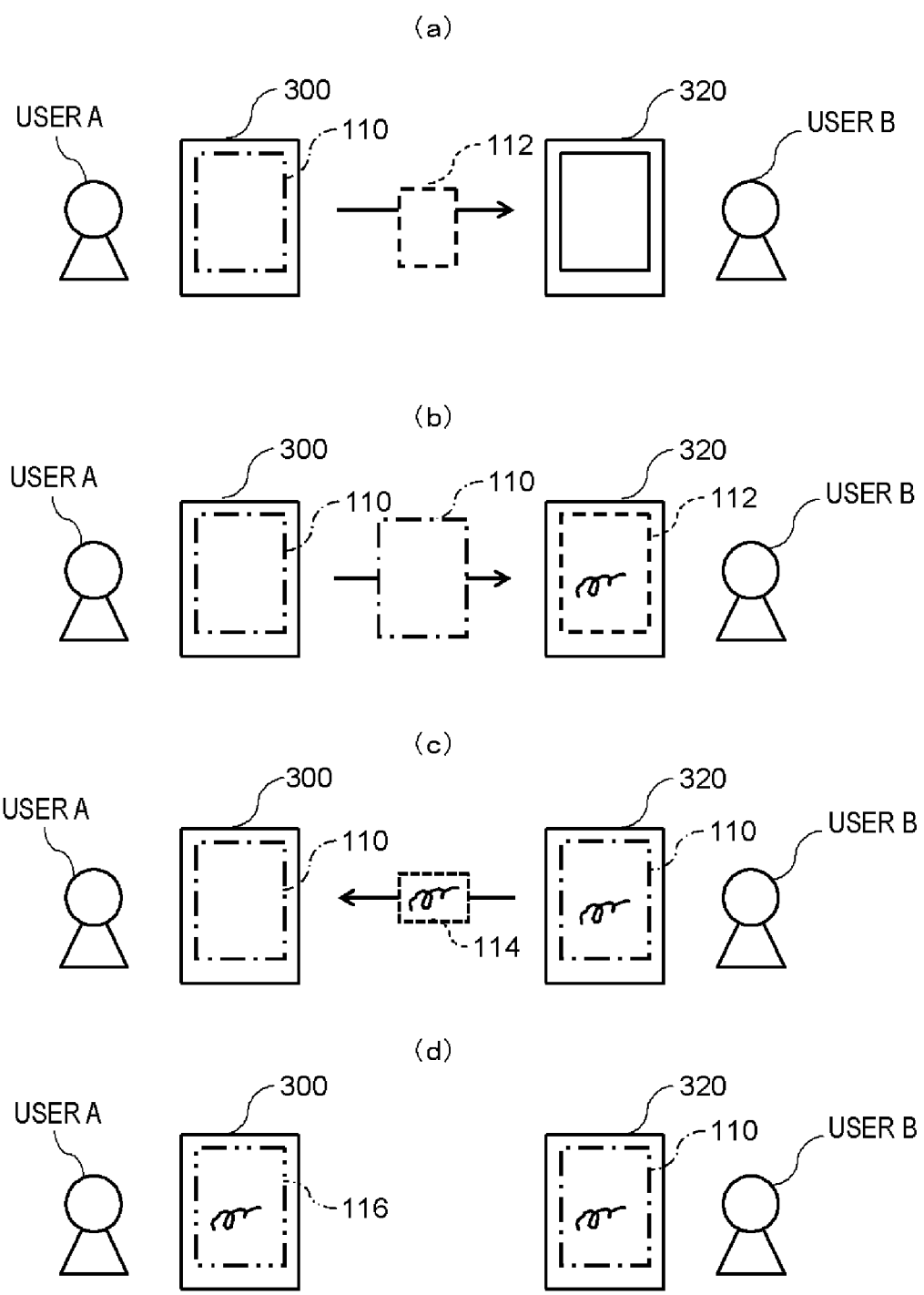
FIG. 9 are diagrams illustrating operations of the first information processing apparatus and the second information processing apparatus according to the exemplary embodiment of the present invention.

FIG. 9 are diagrams illustrating operations of a first information processing apparatus 300 and a second information processing apparatus 320 according to an exemplary embodiment of the present invention.

The exemplary embodiment of the present invention is different from the above-described exemplary embodiments in that the first information processing apparatus 300 also transmits original data 110 to a common processing apparatus (second information processing apparatus 320) after transmitting processed data 112 and in that the second information processing apparatus 320 also receives the original data 110 in addition to the processed data 112 and replaces the processed data 112, which is output in an editable manner in advance, with the original data 110.

Figure 10:
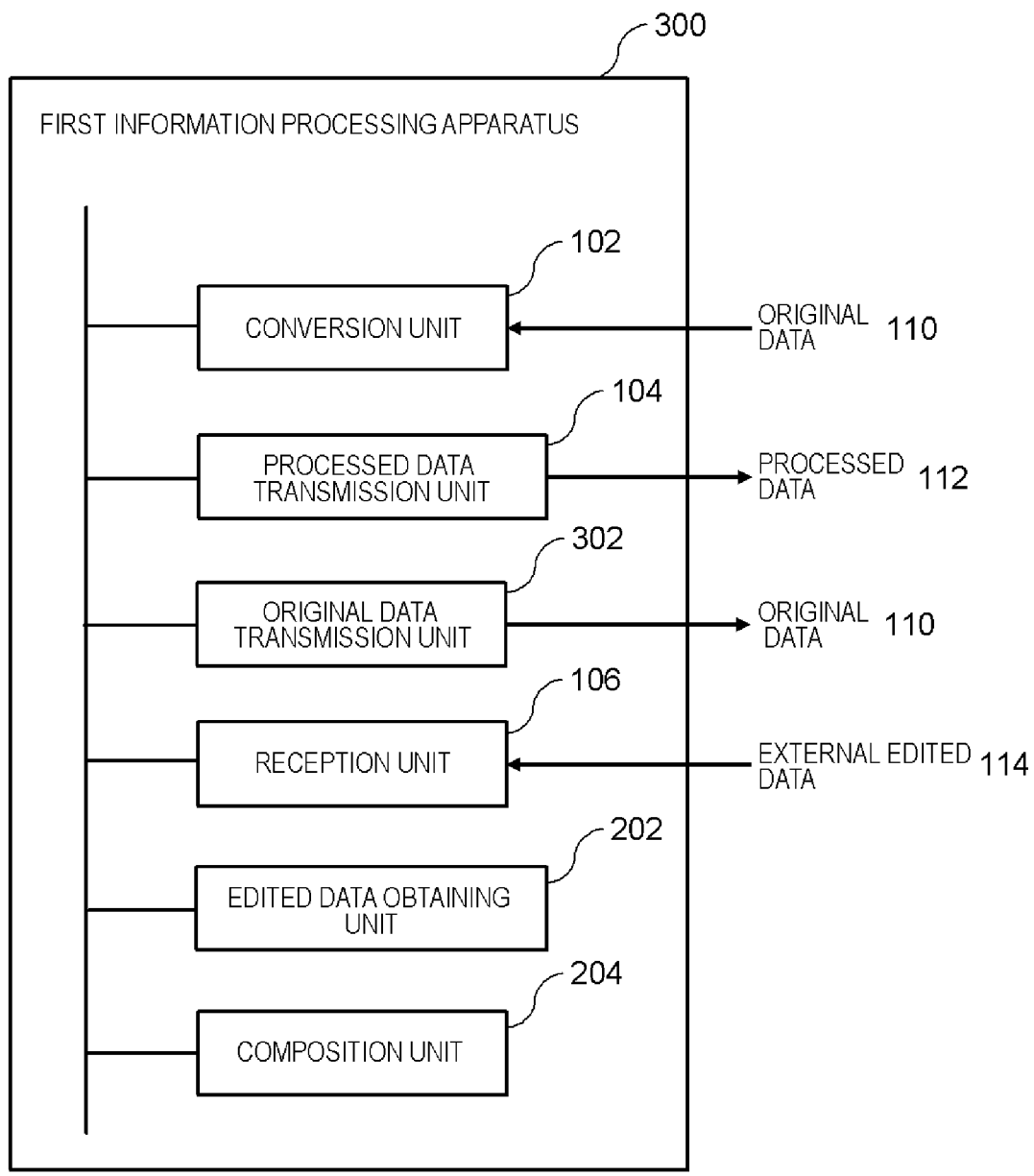
FIG. 10 is a functional block diagram illustrating a configuration of the first information processing apparatus according to an exemplary embodiment of the present invention.
Figure 11:
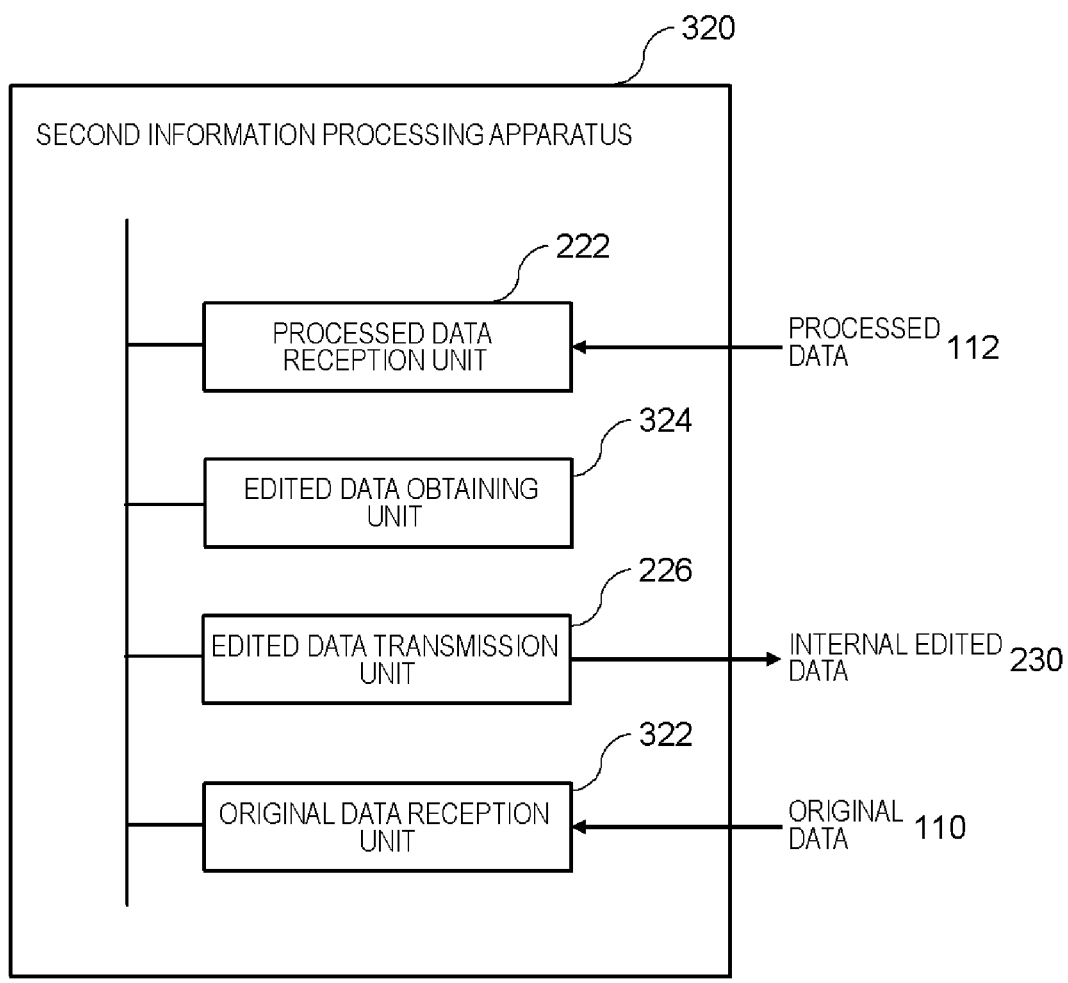
FIG. 11 is a functional block diagram illustrating a configuration of the second information processing apparatus according to the exemplary embodiment of the present invention.

FIG. 10 is a functional block diagram illustrating a configuration of the first information processing apparatus 300 according to the exemplary embodiment of the present invention. FIG. 11 is a functional block diagram illustrating a configuration of the second information processing apparatus 320 according to the exemplary embodiment of the present invention.

As illustrated in FIG. 10, the first information processing apparatus 300 of the present exemplary embodiment includes a conversion unit 102, a processed data transmission unit 104, a reception unit 106, an edited data obtaining unit 202, and a composition unit 204 which are the similar to those of the first information processing apparatus 200 of FIG. 5, and further includes an original data transmission unit 302.

Meanwhile, in the present exemplary embodiment, it is assumed that the first information processing apparatus 300 has the similar configuration to that in FIG. 5, but the present invention is not limited thereto. For example, the first information processing apparatus may be configured to include the conversion unit 102, the processed data transmission unit 104, the reception unit 106, and the composition unit 108 which are the similar to those of the information processing apparatus 100 of FIG. 1, and may further include an edited data obtaining unit 202.

As illustrated in FIG. 11, the second information processing apparatus 320 includes a processed data reception unit 222 and an edited data transmission unit 226 which are the similar to those of the second information processing apparatus 220 of FIG. 6, and further includes an original data reception unit 322. In addition, the second information processing apparatus 320 includes an edited data obtaining unit 324 instead of the edited data obtaining unit 224 of FIG. 6.

The first information processing apparatus 300 according to the exemplary embodiment of the present invention further includes the original data transmission unit 302 that transmits, after transmitting the processed data 112, original data 110 to be edited to a common processing apparatus (second information processing apparatus 320) using a communication unit which is the same as that transmits the processed data, or transmits the original data 110 to be edited to a common processing apparatus (second information processing apparatus 320) in addition to the processed data 112 using a communication unit which is different from the communication unit that transmits the processed data 112.

The second information processing apparatus 320 according to the exemplary embodiment of the present invention further includes the original data reception unit 322 that receives the original data 110 to be edited in addition to the processed data 112, and the edited data obtaining unit 324 that replaces the processed data 112, which is output in an editable manner in advance, with the original data 110 to be edited after the reception of the original data 110 to be edited is completed.

In the first information processing apparatus 300, for example, the processed data 112 transmitted by the processed data transmission unit 104 has a volume which is smaller than that of the original data 110, and thus may be transmitted using a low-speed communication unit such as Bluetooth, infrared rays, or non-contact IC communication. On the other hand, the original data 110 transmitted by the original data transmission unit 302 has a volume which is larger than that of the processed data 112, and thus may be transmitted using a high-speed communication unit such as a wireless LAN, a wide-area communication network, or the Internet.

On the other hand, the processed data 112 has a small capacity but is desired to be transmitted to a common processing apparatus more rapidly, and thus a high-speed communication unit is used. On the contrary, the transmission of the original data 110, at worst, may be completed just before termination of editing, and thus a low-speed communication unit may be used.

In addition, the phrase "after the transmission of the processed data 112" does not necessarily mean the completion of reception on the common processing apparatus (second information processing apparatus 320) side. After a process of transmitting the processed data 112 is started on the first information processing apparatus 300 side, the original data 110 may be transmitted in parallel. Alternatively, the original data 110 may be transmitted when a request for the reception of the original data is received from the second information processing apparatus 320 after the processed data 112 is transmitted.

In the second information processing apparatus 320, the original data reception unit 322 receives the original data 110 from the first information processing apparatus 300. Regarding a timing of the reception, for example, a request for the reception may be made from the second information processing apparatus 320 to the first information processing apparatus 300 at an arbitrary timing, or the original data 110 transmitted at a timing determined by the first information processing apparatus 300 may be received whenever the occasion demands. Alternatively, when a state where the second information processing apparatus 320 can receive the original data 110 is set after the processed data 112 is received, a request for the transmission may be made to the first information processing apparatus 300 at an arbitrary timing.

First, as illustrated in FIG. 9(b), when the processed data 112 received by the processed data reception unit 222 is displayed on a display unit 26 (FIG. 2) and the original data reception unit 322 receives the original data 110, the edited data obtaining unit 324 replaces the processed data 112 displayed on the display unit 26 with the original data 110 and displays the processed data as illustrated in FIG. 9(c). A timing of the display is not particularly limited. For example, the processed data 112 may be gradually replaced with the original data 110 while receiving the original data 110, or the processed data 112 may be collectively replaced with the original data 110 after the reception of the original data 110 is completed. Alternatively, a user may be notified that the reception of the original data 110 has been completed, using a notification unit such as an icon, an updating button for updating a display screen to a latest state, or the like, may be provided, and the processed data may be replaced with the original data 110 at a timing when a user's operation is received.

In addition, the second information processing apparatus 320 may further include a reception unit 106 which is the similar to that of the first information processing apparatus 200 of FIG. 5. That is, internal edited data in the first information processing apparatus 200 which is external edited data for the second information processing apparatus 320 may be received by the reception unit 106 and may be delivered to the edited data obtaining unit 324, and the external edited data may be reflected in the processed data 112 by the edited data obtaining unit 324 and may be displayed in an editable manner on the display unit 26 (FIG. 2).

Further, the second information processing apparatus 320 may further include a composition unit 204 which is the similar to that of the first information processing apparatus 200 of FIG. 5. According to such a configuration, the internal edited data obtained by the edited data obtaining unit 324 of the second information processing apparatus 320 or the external edited data may be reflected in the original data 110 to thereby generate composed data. By the second information processing apparatus 320, the composed data may be stored in a memory 14 (FIG. 2), may be recorded in a recording medium in which writing can be performed by the second information processing apparatus 320, or may be transmitted to another apparatus.

In the first information processing apparatus 300 of the present exemplary embodiment, a CPU 12 (FIG. 2) executes various types of processing operations corresponding to a computer program 42 (FIG. 2), and thus the above-mentioned various types of units are realized as various types of functions.

The computer program 42 of the present exemplary embodiment is described as causing a computer for realizing the first information processing apparatus 300 to further execute a procedure of transmitting, after transmitting the processed data 112, the original data 110 to be edited to a common processing apparatus (second information processing apparatus 320) using a communication unit which is the same as that transmits the processed data, or transmitting the original data 110 to be edited to the second information processing apparatus 320 in addition to the processed data 112 using a communication unit which is different from the communication unit that transmits the processed data 112, in addition to the procedures of the computer program of the above-described exemplary embodiment.

In the second information processing apparatus 320 of the present exemplary embodiment, the CPU 12 (FIG. 2) executes various types of processing operations corresponding to the computer program 42 (FIG. 2), and thus the above-mentioned various types of units are realized as various types of functions.

The computer program 42 of the present exemplary embodiment is described as causing a computer for realizing the second information processing apparatus 320 to further execute a procedure of receiving the original data 110 to be edited in addition to the processed data 112 and a procedure of replacing the processed data 112, which is output in an editable manner in advance, with the original data 110 to be edited after the reception of the original data 110 to be edited is completed, in addition to the procedures of the computer program of the above-described exemplary embodiment.

Operations of the first information processing apparatus 300 and the second information processing apparatus 320 of the present exemplary embodiment which are thus configured in this manner will be described below with reference to FIG. 9.

Here, an operation in a case where a user A and a user B share a photograph using the first information processing apparatus 300 and the second information processing apparatus 320 respectively and where editing contents of the user B is shared with the user A will be described as an example.

First, in the first information processing apparatus 300, the conversion unit 102 converts the original data 110 into the processed data 112, and the processed data transmission unit 104 transmits the processed data 112 to the second information processing apparatus 320 (FIG. 9(*a*)). At this time, in the drawing, the original data 110 is displayed on the display unit 26 (FIG. 2) of the first information processing apparatus 300. However, the present invention is not limited thereto, and the processed data 112 may be displayed. Although not shown in the drawing, the first information processing apparatus 300 also receives an editing operation on the original data 110 or the processed data 112, and the composition unit 204 reflects the edition in the original data 110.

In the second information processing apparatus 320, the processed data reception unit 222 receives the processed data 112 and displays the data on the display unit 26 (FIG. 2). At this time, the user B of the second information processing apparatus 320 can perform an editing operation on the processed data 112 (FIG. 9(*b*)).

Further, in the first information processing apparatus 300, the original data transmission unit 302 transmits the original data 110 to the second information processing apparatus 320 (FIG. 9(*b*)). In the second information processing apparatus 320, the original data reception unit 322 receives the original data 110, and displays the received original data 110 on the display unit 26 instead of the processed data 112 (FIG. 9(*c*)).

In the second information processing apparatus 320, the edited data transmission unit 226 transmits external edited data 114 indicating editing contents edited on the processed data 112 or the original data 110 to the first information processing apparatus 300 (FIG. 9(*c*)). In the first information processing apparatus 300, the composition unit 204 receives the external edited data 114 from the second information processing apparatus 320, reflects the data in the original data 110, and displays the composed data 116 on the display unit 26 (FIG. 2) (FIG. 9(*d*)).

If an editing operation is also performed in the first information processing apparatus 300, the edition, together with the external edited data 114, is also reflected in the original data 110, and editing contents in the first information processing apparatus 300 may be further transmitted to the second information processing apparatus 320.

As described above, according to the information processing apparatus (300, 320) of the exemplary embodiment of the present invention, it is possible to exhibit the similar effects to those in the above-described exemplary embodiment, to rapidly start the sharing of data with another information processing apparatus by the processed data 112, and to share the original data 110 to be transferred later.

As described above, although the exemplary embodiments of the present invention have been set forth with reference to the drawings, they are merely illustrative of the present invention, and various configurations other than those stated above may be adopted.

For example, in the information processing apparatus of the above-described exemplary embodiment, the conversion unit 102 may analyze the original data 110 to be edited and may partially perform processing on a portion having a small feature amount to thereby generate the processed data 112.

When the resolution of the original data 110 is lowered overall, the entire processed data 112 is set to be in a shaded state. However, according to such a configuration, a portion having a small feature amount is converted so that the data volume thereof is partially reduced. Accordingly, a portion having a large feature amount, for example, a contour of a person or a ridge line of a mountain can be made clear.

For example, when only a contour line is specified, specifically, the conversion unit 102 performs conversion so that the data volume of a portion other than an edge portion detected through an edge detection process performed on the original data 110 to be edited is reduced, thereby generating the processed data 112.

In addition, in the above-described exemplary embodiment, the original data 110 is configured to be stored in the information processing apparatus, but the present invention is not limited thereto. For example, a configuration may be adopted in which the original data 110 is stored on a server using cloud computing and each information processing apparatus performs editing processing on data on a server.

Further, in another exemplary embodiment, the conversion unit 102 may determine the capacity of the processed data 112, the format thereof, and the like which are suitable for a common processing apparatus on the basis of a condition such as apparatus attribute information regarding the common processing apparatus such as a type, a specification, and performance, a type of the original data 110, the data volume of the original data 110, the number of apparatuses participating in sharing, a communication unit, communication state, or a combination thereof, and may perform the corresponding conversion process. Further, apparatus attribute information may be obtained for each common processing apparatus by using a communication unit such as the wireless LAN communication unit 18 or the infrared communication unit 20. Alternatively, apparatus attribute information of a common communication device may be periodically obtained, and a conversion process may be dynamically switched. For example, when the efficiency of communication with the common communication device decreases, countermeasures such as conversion for reducing the data volume of the processed data 112 may be taken.

As mentioned above, although the present invention has been described with reference to the exemplary embodiments and examples, the present invention is not limited to the above-mentioned exemplary embodiments and examples. In the configurations and the details of the present invention, various changes and modifications as can be understood by those skilled in the art may be made within the scope of the present invention.

Hereinafter, an example of a reference configuration will be added.

1. A data processing method of an information processing apparatus, the method including:

causing the information processing apparatus to convert original data to be edited into processed data having a reduced data volume, transmit the processed data to a common processing apparatus, receive external edited data indicating editing contents, edited by the common processing apparatus on the processed data from the common processing apparatus, and reflect the editing contents edited by the common processing apparatus in the original data to be edited, on the basis of the received external edited data.

2. The data processing method of the information processing apparatus according to 1,
wherein the information processing apparatus further
obtains internal edited data indicating editing contents on the original data to be edited or the processed data by outputting, in an editable manner, the original data to be edited or the processed data, and
reflects the editing contents in the original data to be edited on the basis of the internal edited data.

3. The data processing method of the information processing apparatus according to 2,
wherein the information processing apparatus further reflects the received external edited data and the obtained internal edited data in accordance with predetermined priority order.

4. The data processing method of the information processing apparatus according to any one of 1 to 3,
wherein the information processing apparatus further transmits, after transmitting the processed data, the original data to be edited to the common processing apparatus using a communication unit which is the same as that transmits the processed data, or transmits the original data to be edited to the common processing apparatus, in addition to the processed data, by using a communication unit which is different from the communication unit that transmits the processed data.

5. The data processing method of the information processing apparatus according to any one of 1 to 4,
wherein the information processing apparatus further
receives the processed data transmitted from another information processing apparatus,
obtains internal edited data indicating editing contents on the processed data by outputting, in an editable manner, the received processed data, and
transmits the obtained internal edited data to the another information processing apparatus.

6. The data processing method of the information processing apparatus according to 5,
wherein the information processing apparatus further
receives the original data to be edited in addition to the processed data, and
replaces the processed data, which is output in an editable manner in advance, with the original data to be edited after the reception of the original data to be edited is completed.

7. The data processing method of the information processing apparatus according to any one of 1 to 6,
wherein the information processing apparatus further analyzes the original data to be edited and partially performs processing on a portion having a small feature amount to thereby generate the processed data.

8. A data processing method of an information processing apparatus, the method including:
causing the information processing apparatus to
receive processed data, having a reduced data volume, which is obtained by converting original data to be edited from another information processing apparatus,
obtain internal edited data indicating editing contents on the processed data by outputting, in an editable manner, the received processed data, and
transmit the obtained internal edited data to the another information processing apparatus.

This application is based upon and claims the benefit of priority from Japanese Patent Application No. 2013-082660 filed on Apr. 11, 2013, the disclosure of which is incorporated herein in its entirety by reference.

The invention claimed is:

1. A non-transitory computer readable storage medium having a program that causes a computer to execute:
converting original data to be edited into processed data having a reduced data volume;
transmitting the processed data to a common processing apparatus;
receiving first edited data indicating editing contents, edited by the common processing apparatus on the processed data from the common processing apparatus; and
reflecting the editing contents edited by the common processing apparatus in the original data corresponding to the processed data, on the basis of the received first edited data,
wherein the computer and the common processing apparatus each has a first communication interface and a second communication interface, the first communication interface being a low-speed communication unit, and the second communication interface being a high-speed communication unit,
and the program further causes the computer to execute:
further transmitting, after transmitting the processed data by using one of the first communication interface and the second communication interface, the original data corresponding to the processed data to the common processing apparatus by using one of the first communication interface and the second communication interface; and
transmitting, after transmitting the processed data by using one of the first communication interface and the second communication interface, when the original data corresponding to the processed data is transmitted by using the other communication interface, which is different from the one communication interface that is used to transmit the processed data,
when the processed data having a data volume smaller than a data volume of the original data is transmitted via the second communication interface, thereafter the original data corresponding to the processed data is transmitted via the first communication interface while
when the processed data is transmitted via the first communication interface, thereafter the original data having a data volume larger than a data volume of the processed data and the original data corresponding to the processed data is transmitted via the second communication interface,
wherein the low-speed communication unit is configured to perform communication by using at least one of Bluetooth™, infrared rays, and non-contact IC communication, and
wherein the high-speed communication unit is configured to connect to at least one of a wireless LAN (Local Area Network), a wide-area communication network for a mobile phone, and Internet.

2. The non-transitory computer readable storage medium according to claim 1, wherein the program further causes the computer to execute:
obtaining second edited data indicating editing contents on the original data corresponding to the processed data or the processed data by displaying, on a display of the computer, the original data corresponding to the processed data or the processed data and receiving an editing operation operated by a user; and further reflecting the editing contents in the original data corresponding to the processed data, on the basis of the second edited data.

3. The non-transitory computer readable storage medium according to claim 2, wherein the program further causes the computer to execute:

reflecting the received first edited data and the obtained second edited data in accordance with predetermined priority order.

4. The non-transitory computer readable storage medium according to claim 1, wherein the program further causes the computer to execute:

receiving the processed data transmitted from another information processing apparatus;

obtaining second edited data indicating editing contents on the processed data by displaying, on a display of the computer, the received processed data and receiving an editing operation operated by a user; and transmitting the obtained second edited data to said another information processing apparatus.

5. The non-transitory computer readable storage medium according to claim 4, wherein the program further causes the computer to execute:

receiving the original data corresponding to the processed data in addition to the processed data; and displaying the received original data corresponding to the processed data on a display of the computer by replacing the processed data, which is displayed on the display of the computer before receiving the original data corresponding to the processed data, with the received original data corresponding to the processed data.

6. The non-transitory computer readable storage medium according to claim 1, wherein the program further causes the computer to execute:

analyzing the original data corresponding to the processed data and partially performing processing on a portion having a small feature amount to thereby generate the processed data.

7. A non-transitory computer readable storage medium having a program that causes a computer to execute:

receiving processed data having a reduced data volume, which is obtained by converting original data corresponding to the processed data from another information processing apparatus;

obtaining edited data indicating editing contents on the processed data by outputting, in an editable manner, the received processed data; and transmitting the obtained edited data to said another information processing apparatus, wherein the computer and the another information processing apparatus each has a first communication interface and a second communication interface, the first communication interface being a low-speed communication unit, and the second communication interface being a high-speed communication unit, the program further causes the computer to execute:

further receiving, after receiving the processed data by using one of the first communication interface and the second communication interface, the original data corresponding to the processed data to the another information processing apparatus by using one of the first communication interface and the second communication interface; and receiving, after receiving the processed data by using one of the first communication interface and the second communication interface, when the original data corresponding to the processed data is received by using the other communication interface, which is different from the one communication interface that is used to receive the processed data, when the processed data having a data volume smaller than a data volume of the original data is transmitted via second communication interface, thereafter the original data corresponding to the processed data is transmitted via the first communication interface while when the processed data is transmitted via the first communication interface, thereafter the original data having a data volume larger than a data volume of the processed data and the original data corresponding to the processed data is transmitted via the second communication interface after receiving the processed data, wherein the low-speed communication unit is configured to perform communication by using at least one of Bluetooth™, infrared rays, and non-contact IC communication, and wherein the high-speed communication unit is configured to connect to at least one of a wireless LAN (Local Area Network), a wide-area communication network for a mobile phone, and Internet.

8. An information processing apparatus comprising:

memory storing instructions; and a processor configured to execute the instructions to:

convert original data to be edited into processed data having a reduced data volume;

transmit the processed data to a common processing apparatus;

receive first edited data indicating editing contents, edited by the common processing apparatus on the processed data from the common processing apparatus; and reflect the editing contents edited by the common processing apparatus in the original data corresponding to the processed data, on the basis of the received first edited data, wherein the information processing apparatus and the common processing apparatus each has a first communication interface and a second communication interface, the first communication interface being a low-speed communication unit, and the second communication interface being a high-speed communication unit, and the processor is further configured to execute the instructions to transmit, after transmitting the processed data via one of the first communication interface and the second communication interface, the original data corresponding to the processed data to the common processing apparatus is transmitted via one of the first communication interface and the second communication interface, and after transmitting the processed data via one of the first communication interface and the second communication interface, when the original data corresponding to the processed data is transmitted via the other communication interface, which is different from the one communication interface that is used to transmit the processed data, when the processed data having a data volume smaller than a data volume of the original data is transmitted via the second communication interface, thereafter the original data corresponding to the processed data is transmitted via the first communication interface while when the processed data is transmitted via the first communication interface, thereafter the original data having a data volume larger than a data volume of the processed data and the original data corresponding to the processed data is transmitted via the second communication interface, wherein the low-speed communication unit is configured to perform communication by using at least one of Bluetooth™, infrared rays, and non-contact IC communication, and wherein the high-speed communication unit is configured to connect to at least one of a wireless LAN (Local Area Network), a wide-area communication network for a mobile phone, and Internet.

9. The information processing apparatus according to claim 8, further comprising:

a display; and wherein the processor is further configured to execute the instructions to:

obtain second edited data indicating editing contents on the original data corresponding to the processed data or the processed data by displaying on the display the original data corresponding to the processed data or the processed data and receiving an editing operation operated by a user, and reflect the editing contents in the original data corresponding to the processed data, on the basis of the second edited data.

10. The information processing apparatus according to claim 9, wherein the processor is further configured to execute the instructions to reflect the received first edited data and the obtained second edited data in accordance with predetermined priority order.

11. The information processing apparatus according to claim 8, further comprising:

a display;

wherein the processor is further configured to execute the instructions to:

receive the processed data transmitted from another information processing apparatus;

obtain second edited data indicating editing contents on the processed data by displaying on the display the received processed data and receiving an editing operation operated by a user; and transmit the obtained second edited data to said another information processing apparatus.

12. The information processing apparatus according to claim 11, wherein the processor is further configured to execute the instructions to:

receive the original data corresponding to the processed data in addition to the processed data; and display the received original data corresponding to the processed data on the display of the computer by replacing the processed data, which is on the display before receiving the original data corresponding to the processed data, with the received original data corresponding to the processed data.

13. The information processing apparatus according to claim 8, wherein the processor is further configured to execute the instructions to analyze the original data corresponding to the processed data and partially perform processing on a portion having a small feature amount to thereby generate the processed data.

14. An information processing apparatus comprising:

memory storing instructions; and a processor configured to execute the instructions to:

receive processed data, having a reduced data volume, which is obtained by converting original data corresponding to the processed data from another information processing apparatus;

obtain edited data indicating editing contents on the processed data by outputting, in an editable manner, the received processed data; and transmit the obtained edited data to said another information processing apparatus, wherein the information processing apparatus and the another information processing apparatus each has a first communication interface and a second communication interface, and the processor is further configured to execute the instructions to receive, after receiving the processed data by using one of the first communication interface and the second communication interface, the original data corresponding to the processed data to the another information processing apparatus by using one of the first communication interface and the second communication interface; and receive, after receiving the processed data by using one of the first communication interface and the second communication interface, when the original data corresponding to the processed data is received by using the other communication interface, which is different from the one communication interface that is used to receive the processed data, when the processed data having a data volume smaller than a data volume of the original data is transmitted via the second communication interface, thereafter the original data corresponding to the processed data is transmitted via the first communication interface while when the processed data is transmitted via the first communication interface, thereafter the original data having a data volume larger than a data volume of the processed data and the original data corresponding to the processed data is transmitted via the second communication interface after receiving the processed data, wherein the low-speed communication unit is configured to perform communication by using at least one of Bluetooth™, infrared rays, and non-contact IC communication, and wherein the high-speed communication unit is configured to connect to at least one of a wireless LAN (Local Area Network), a wide-area communication network for a mobile phone, and Internet.

15. A data processing method of an information processing apparatus, the method comprising:

causing the information processing apparatus to:

convert original data to be edited into processed data having a reduced data volume, transmit the processed data to a common processing apparatus, receive edited data indicating editing contents edited by the common processing apparatus on the processed data from the common processing apparatus, and reflect the editing contents edited by the common processing apparatus in the original data corresponding to the processed data, on the basis of the received edited data, wherein the information processing apparatus and the common processing apparatus each has a first communication interface and a second communication interface, the first communication interface being a low-speed communication unit, and the second communication interface being a high-speed communication unit, and the method further comprises causing the information processing apparatus to:

transmit, after transmitting the processed data by using one of the first communication interface and the second communication interface, the original data corresponding to the processed data to the common processing apparatus by using one of the first communication interface and the second communication interface; and transmit, after transmitting the processed data by using one of the first communication interface and the second communication interface, when the original data corresponding to the processed data is transmitted by using the other communication interface, which is different from the one communication interface that is used to transmit the processed data, when the processed data having a data volume smaller than a data volume of the original data is transmitted via the second communication interface, thereafter the original data corresponding to the processed data is transmitted via the first communication interface while when the processed data is transmitted via the first communication interface, thereafter the original data having a data volume larger than a data volume of the processed data and the original data corresponding to the processed data is transmitted via the second communication interface, and the original data corresponding to the processed data, wherein the low-speed communication unit is configured to perform communication by using at least one of Bluetooth™, infrared rays, and non-contact IC communication, and wherein the high-speed communication unit is configured to connect to at least one of a wireless LAN (Local Area Network), a wide-area communication network for a mobile phone, and Internet.

16. A data processing method of an information processing apparatus, the method comprising:

causing the information processing apparatus to:

receive processed data, having a reduced data volume, obtained by converting original data corresponding to the processed data from another information processing apparatus, obtain edited data indicating editing contents on the processed data by outputting, in an editable manner, the received processed data, and transmit the obtained edited data to said another information processing apparatus, wherein the information processing apparatus and the another information processing apparatus each has a first communication interface and a second communication interface, the first communication interface being a low-speed communication unit, and the second communication interface being a high-speed communication unit, and the method further comprises causing the information processing apparatus to:

receive, after receiving the processed data by using one of the first communication interface and the second communication interface, the original data corresponding to the processed data to the another information processing apparatus by using one of the first communication interface and the second communication interface; and receive, after receiving the processed data by using one of the first communication interface and the second communication interface, when the original data corresponding to the processed data is received by using the other communication interface, which is different from the one communication interface that is used to receive the processed data, when the processed data having a data volume smaller than a data volume of the original data is transmitted via the second communication interface, thereafter the original data corresponding to the processed data is transmitted via the first communication interface while when the processed data is transmitted via the first communication interface, thereafter the original data having a data volume larger than a data volume of the processed data and the original data corresponding to the processed data is transmitted via the second communication interface after receiving the processed data, wherein the low-speed communication unit is configured to perform communication by using at least one of Bluetooth™, infrared rays, and non-contact IC communication, and wherein the high-speed communication unit is configured to connect to at least one of a wireless LAN (Local Area Network), a wide-area communication network for a mobile phone, and Internet.

* * * * *